United States Patent
Dinda et al.

(10) Patent No.: US 8,145,760 B2
(45) Date of Patent: Mar. 27, 2012

(54) METHODS AND SYSTEMS FOR AUTOMATIC INFERENCE AND ADAPTATION OF VIRTUALIZED COMPUTING ENVIRONMENTS

(75) Inventors: Peter Dinda, Evanston, IL (US); Ananth Sundararaj, Redmond, WA (US); John Lange, Evanston, IL (US); Ashish Gupta, Evanston, IL (US); Bin Lin, Hillsboro, OR (US)

(73) Assignee: Northwestern University, Evanston, IL (US)

( * ) Notice: Subject to any disclaimer, the term of this patent is extended or adjusted under 35 U.S.C. 154(b) by 432 days.

(21) Appl. No.: 11/782,486

(22) Filed: Jul. 24, 2007

(65) Prior Publication Data

US 2008/0155537 A1 Jun. 26, 2008

Related U.S. Application Data

(60) Provisional application No. 60/832,820, filed on Jul. 24, 2006.

(51) Int. Cl.
G06F 15/173 (2006.01)
G06F 9/46 (2006.01)
(52) U.S. Cl. ........................ 709/226; 718/100
(58) Field of Classification Search ...... 718/1, 100–108; 709/223–226
See application file for complete search history.

(56) References Cited

U.S. PATENT DOCUMENTS

2007/0233862 A1* 10/2007 Satish et al. ................. 709/225

OTHER PUBLICATIONS ("Towards Virtual Networks for Virtual Machine Grid Computing" Sundararaj, Ananth; Dinda, Peter; Northwestern University CS Department; Oct. 24, 2003).*
("Using Passive Traces of Application Traffic in a Network Monitoring System"; Zangrilli, Marcia; Lowekamp, Bruce; IEEE; 2004).*
ACM ("Dynamic topology adaptation of virtual networks of virtual machines"; Sundararaj, Gupta, Dinda; ACM International Conference Proceeding Series; vol. 81; Proceedings of the 7th Workshop on languages, compilers, and run-time support for scalable systems; Houston, TX; Oct. 22-23, 2004).*
Stoica (Earliest Eligible Virtual Deadline First: A Flexible and Accurate Mechanism for Proportional Share Resource Allocation; Stoica, Ion; Abdel-Wahab, Hussein; Old Dominion University; Jan. 26, 1996).*

* cited by examiner

*Primary Examiner* — Ian N Moore
*Assistant Examiner* — Afshawn Towfighi
(74) *Attorney, Agent, or Firm* — McAndrews, Held & Malloy, Ltd.

(57) ABSTRACT

Certain embodiments of the present invention provide systems and method for automatic inference and adaptation of a virtualized computer environment. Certain embodiments of a system include a virtual topology and traffic inference framework tool adapted to monitor traffic for an application on a virtual network to produce a view of network demands for the application. The system also includes a monitoring tool adapted to monitor performance of an underlying physical network associated with the virtual network using traffic for the application. Further, the system includes an adaptation component adapted to automatically adapt the application to the virtual network based on the measured application traffic, the monitored network performance, and one or more adaptation control algorithms.

27 Claims, 15 Drawing Sheets

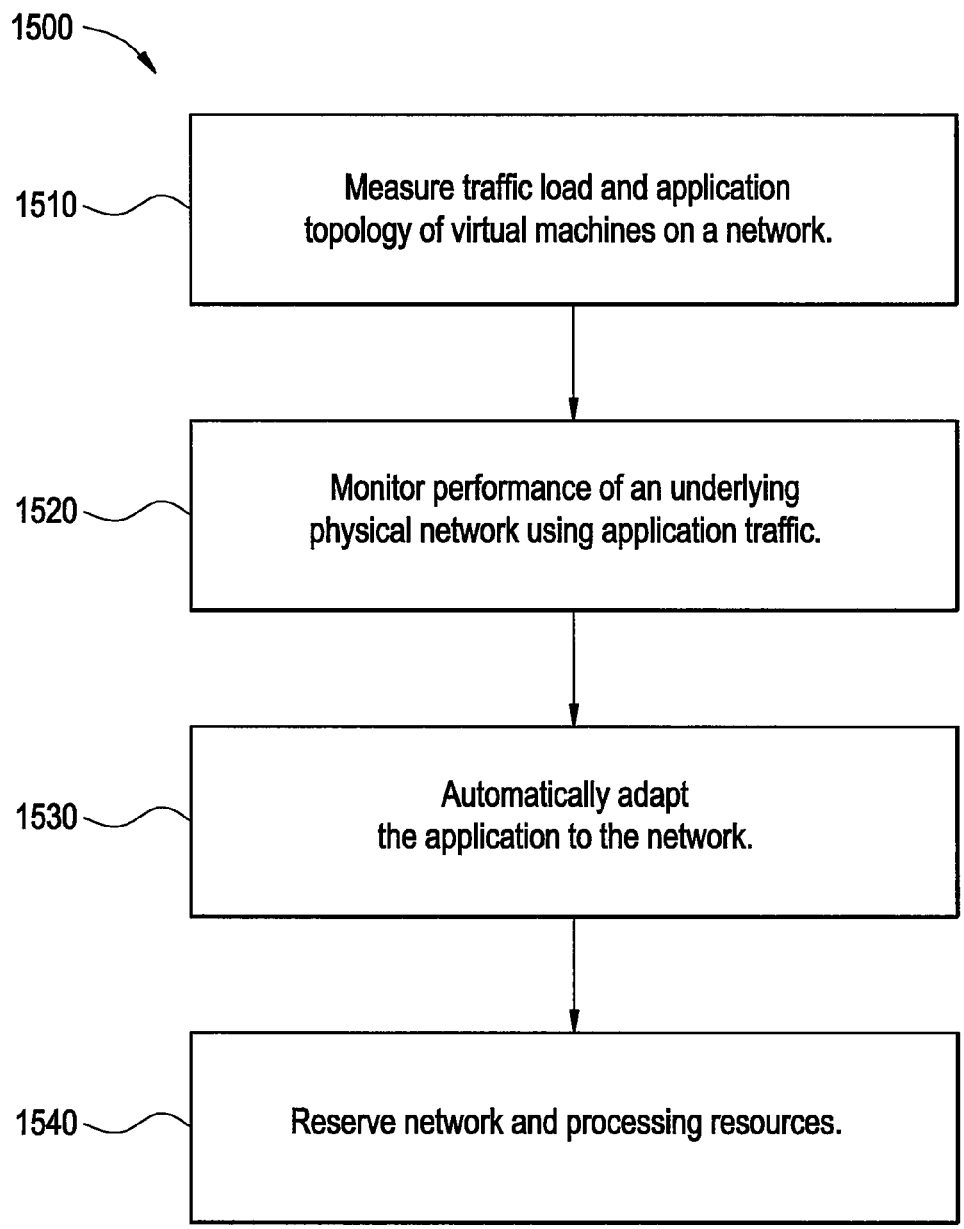

METHODS AND SYSTEMS FOR AUTOMATIC INFERENCE AND ADAPTATION OF VIRTUALIZED COMPUTING ENVIRONMENTS

RELATED APPLICATIONS

This application relates to and claims the benefit of priority from U.S. Provisional Application No. 60/832,820, entitled "Automatic Inference and Adaptation for Virtualized Computing Environments," filed on Jul. 24, 2006, which is herein incorporated by reference in its entirety.

FEDERALLY SPONSORED RESEARCH OR DEVELOPMENT

This invention was made with government support under Grant Nos. ANI 0301108 and EIA-0224449 awarded by the National Science Foundation. The government has certain rights in the invention.

BACKGROUND OF THE INVENTION

The present invention generally relates to adaptation of virtualized computing environments. More particularly, the present invention relates to methods and systems providing automatic inference and adaptation of virtualized computing environments.

Virtual machines (VMs) interconnected with virtual networks are an extremely effective platform for service-oriented computing, utility computing, distributed computing, parallel computing, and high performance computing, providing benefits of simplicity and flexibility to both users and providers. Such a platform also provides key opportunities for adaptation, for example.

Virtual machines can greatly simplify grid and distributed computing by lowering the level of abstraction from traditional units of work, such as jobs, processes, or remote procedure calls (RPCs) to that of a raw machine. This abstraction makes resource management easier from the perspective of resource providers and results in lower complexity and greater flexibility for resource users. A virtual machine image that includes preinstalled versions of the correct operating system, libraries, middleware and applications can simplify deployment of new software.

Grid computing uses multiple sites with different network management and security philosophies, often spread over the wide area. Running a virtual machine on a remote site is equivalent to visiting the site and connecting to a new machine. The nature of the network presence (e.g., active Ethernet port, traffic not blocked, mutable Internet Protocol (IP) address, forwarding of its packets through firewalls, etc.) the machine gets, or whether the machine gets a network presence at all, depends upon the policy of the site. Not all connections between machines are possible and not all paths through the network are free. The impact of this variation is further exacerbated as the number of sites is increased, and if virtual machines are permitted to migrate from site to site.

Over the past decade, wide-area distributed computing has emerged as a powerful computing paradigm. However, developing applications for such environments has remained a challenge, primarily due to the issues involved in designing automatic, dynamic and runtime adaptation schemes. Despite many efforts, adaptation in distributed applications has remained application specific and dependent on direct involvement of the developer or user. Such custom adaptation involving the user or developer is extremely difficult due to the dynamic nature of application demands and resource availability.

BRIEF SUMMARY OF THE INVENTION

Certain embodiments of the present invention provide systems and method for automatic inference and adaptation of a virtualized computer environment. Certain embodiments of a system include a virtual topology and traffic inference framework tool adapted to monitor traffic for an application on a virtual network to produce a view of network demands for the application. The system also includes a monitoring tool adapted to monitor performance of an underlying physical network associated with the virtual network using traffic for the application. Further, the system includes an adaptation component adapted to automatically adapt the application to the virtual network based on the measured application traffic, the monitored network performance, and one or more adaptation control algorithms.

Certain embodiments of a method include measuring application traffic on a virtual network to infer network demands for an application. Additionally, the method includes monitoring performance of an underlying physical network associated with the virtual network using application traffic. Further, the method includes automatically adapting the application to the virtual network based on the measured application traffic, the monitored network performance, and one or more adaptation control algorithms.

Certain embodiments provide one or more computer readable mediums having one or more sets of instructions for execution on one or more computing devices. The one or more sets of instructions include a virtual topology and traffic inference framework module adapted to monitor traffic for an application on a virtual network to produce a view of network demands for the application. The one or more sets of instructions also include a monitoring module adapted to monitor performance of an underlying physical network associated with the virtual network using traffic for the application. Additionally, the one or more sets of instructions include an adaptation module adapted to automatically adapt the application to the virtual network based on the measured application traffic, the monitored network performance, and one or more adaptation control algorithms. Furthermore, the one or more sets of instructions include a reservation and scheduling module adapted to automatically reserve network and virtual machine processing resources for the application.

BRIEF DESCRIPTION OF SEVERAL VIEWS OF THE DRAWINGS

FIG. 15 illustrates a flow diagram for a method for performance improvement in a virtual network according to an embodiment of the present invention The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Figure 1:
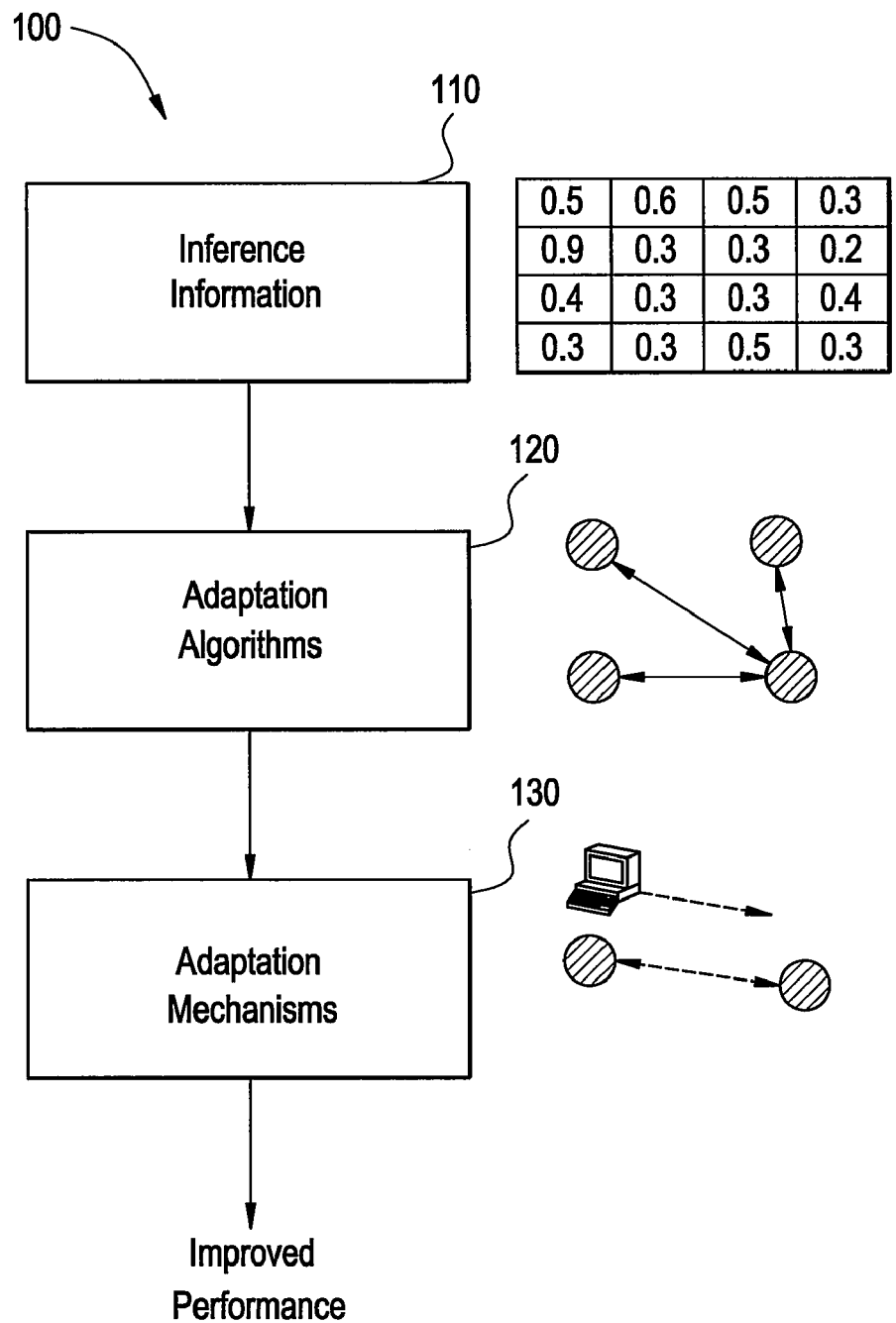
FIG. 1 illustrates steps and functionality for improved virtual network performance in accordance with an embodiment of the present invention.

Certain embodiments of the present invention provide systems and methods for automatic inference and adaptation of a virtualized computer environment. Certain embodiments monitor an application's traffic on a network to automatically and cheaply produce a view of the application's network demands using a measurement tool, such as a Virtual Topology and Traffic Inference Framework (VTTIF) tool.

Certain embodiments monitor performance of the underlying physical network using the application's own traffic as measurement traffic for external tools, and letting those external tools automatically and cheaply probe and characterize the network. For example, through integration of William and Mary's Wren monitoring tool into a system for virtual machine grid computing, such as Northwestern University's Virtuoso virtual middleware system.

In certain embodiments, the application is automatically adapted to the network to allow the application to execute faster and/or more cost-effectively, for example. By providing algorithms for choosing an assignment of virtual machines to physical hosts, an overlay topology among the virtual machines and hosts, and forwarding rules on the overlay topology that maximize or improve application throughput, adaptation control algorithms (e.g., VADAPT, a component of the Virtuoso system) may help allow the application to run faster and/or more effectively.

Certain embodiments provide for reservation of network and central processor unit (CPU) resources to automatically improve performance using reservation and scheduling tools, such as VRESERVE and virtual machine (VM) scheduling software (VSCHED) components of Virtuoso.

Certain embodiments provide automatic determination of appropriate paths in a variety of networks, such as circuit switching networks, optical lightpath networks, packet switching networks, etc. based on path throughput and latency, for example. Certain embodiments automatically reserve paths based on appropriate determinations. Furthermore, path resources and reservations may be dynamically changed at run-time as the communication needs of an application change. Certain embodiments work with existing, unmodified applications and operating systems with no user or developer intervention and may extend to other network reservation schemes as well.

Virtual execution environments provide a platform for inferring application resource demands and measuring available computational and network resources. Further, virtual environments may be configured to make available application independent adaptation mechanisms such as VM migration, overlay network topology and routing changes and resource reservations. One or more algorithms may be used to drive these adaptation mechanisms as guided by the measured and inferred data, for example.

Certain embodiments provide techniques, tools, and benefits, such as those discussed above, to existing, unmodified applications and operating systems as well as new or modified applications and operating system. Certain embodiments provides application inference embodied in VTTIF using inter-VM traffic to infer network behavior (e.g., the Wren monitoring tool) along with techniques and algorithms for automatic adaptation and reservation (e.g., VADAPT and VRESERVE). Related functions include virtual networking overlay software (VNET), VM scheduling software (VSCHED), and a system integrating these components, Virtuoso.

In accordance with certain embodiments of the present invention, existing, unmodified applications and operating systems run inside of virtual machines (VMs). A VM can be treated as a process within an underlying "host" operating system (such as a type-II virtual machine monitor (VMM)) or within the VMM itself (e.g., a type-I VMM). The VMM presents an abstraction of a network adaptor to the operating system running inside of the VM. An overlay network is attached to this virtual adaptor. The overlay network (VNET) ties the VM to other VMs and to an external network. From a vantage point "under" the VM and VMM, tools can observe the dynamic behavior of the VM, specifically its computational and communications demands.

By observing the network traffic sourced and sinked by the VM, tools can be used to determine to whom the VM talks and how much communication occurs. This information is aggregated globally, applying carefully designed, adaptation-aware de-noising algorithms to reduce the information to a global traffic load matrix among all of the VMs and to an application topology. The application topology is a graph representing the communication behavior of the application. This process, accomplished in one implementation by the VTTIF tool, partially drives adaptation. The graph also carries VM computation demands inferred locally. Note that the information about the application gleaned by this approach requires no modification of either the application or the operating system (OS) and presents a small overhead to the overlay networking system.

Adaptation is also driven by changing conditions on the underlying network. For example, packets sent over the overlay network on behalf of the VM are used to monitor bandwidth, latency, and topology of the underlying physical network interconnecting the machines on which the VMs are hosted. For example, a monitoring tool such as the Wren passive network management tool may be interfaced with a VM traffic-carrying overlay network to monitor bandwidth, latency, and topology of the underlying physical network. The overhead of using passive monitoring tools is likely to be small. Furthermore, no changes to the application or OS should need to use passive monitoring tools.

In certain embodiments, several adaptation mechanisms are available. VM migration can be used to move a VM to a more suitable host, for example. The overlay topology can be modified to better suit the traffic the network is carrying. Individual links in the topology can be included, removed, changed to use a different transport protocol, and/or configured to manipulate the carried packets, for example. Routes that traffic take can be changed as well.

Additionally, the underlying physical network and the hosts may provide reservation mechanisms. Certain embodiments provide techniques for integrating optical network reservations ("light paths") and CPU reservations into a VM-based computing system. Specifically, these techniques are implemented in the VRESERVE and VSCHED tools. Certain embodiments include automatic light path reservation on behalf of communicating VMs, an extension of this technique for making reservations on packet-switched networks, and periodic real-time scheduling of VMs to mix batch and interactive workloads on the same host, for example.

Certain embodiments of the invention provide a family of algorithms and techniques for automatic adaptation that use the information sources and mechanisms just described to improve performance of unmodified applications and operating systems. Specifically, a combination of information in the application and network graphs, adaptation mechanisms, and a user-supplied objective functions form an optimization problem solved according to certain embodiments of the present invention. In general, the optimization problems so formed are NP-Hard. Certain embodiments provide both the formulation of such problems and techniques for their solution. Specifically, heuristic approaches for solving several constrained variants of the problem, general purpose approaches based on evolutionary computation (e.g., simulated annealing and genetic algorithms/programming), and approaches that involve user interaction to define problem instances and search for high quality solutions may be used in solving resource adaptation problems. These ideas are embodied in the VADAPT tool, for example.

In accordance with certain embodiments, general purpose approaches are used for solving problems for which the objective is not performance, but rather security. In particular, the techniques can be used to determine the security policies of one or more sites automatically, and then define optimization problems whose solutions would help ensure connectivity for VMs hosted at those sites. In effect, the VM can be made to provide the best performance possible while still automatically conforming to security policies. The applications in and users of the VMs would not need to be involved in this process.

Among other areas, commercialization potential resides at least at the intersection of virtualization and autonomic computing. Virtualization techniques are becoming widely used within service providers and data centers for server consolidation and other purposes. Systems such as VMware's VMotion system provide several of the basic adaptation mechanisms described above, but ask the system administrators to manage them. Simultaneously, companies, such as IBM, have been making large scale investments in autonomic computing, the goal of which is to automate the management of applications and systems. Certain embodiments of the present invention provide autonomic computing solutions for virtualized computing environments.

Additionally, in high performance computing and grid computing, it is increasingly common to seek to deploy parallel and distributed applications that span computing resources at multiple, independently managed sites. Because the sites can be dramatically different in their capabilities, connectivity, and security policies, virtualization provides a natural "layer" to unify the sites. However, because the applications running in these environments may have different tolerances for low or varying bandwidth and latency, an application may be assigned to a subset of network resources having the communication and computation resources for the particular application. Network resources may include one or more of a central processing unit (CPU) or other processor, a memory, throughput (bytes/second), etc. Such resource assignments may be made for existing, unmodified applications. Interfaces suitable for this work include VMMs as diverse as VMware, Xen, Virtual PC, Virtual Server, User Mode Linux, and VServer, for example.

Virtual machine distributed computing simplifies use of widespread computing resources by lowering the level of abstraction, benefiting both resource providers and users. Towards that end, Virtuoso middleware closely emulates the existing process of buying, configuring and using physical machines. Virtuoso's VNET component is a simple and efficient layer 2 virtual network overlay tool that makes virtual machines appear to be physically connected to the home network of the user while simultaneously supporting arbitrary topologies and routing among them. Virtuoso's VTTIF component continually infers the communication behavior of the application running in a collection of VMs. The combination of overlays like VNET and inference frameworks like VTTIF has great potential to increase the performance, with no user or developer involvement, of existing, unmodified applications by adapting their virtual environments to the underlying computing infrastructure to best suit the applications. Continually inferred application topology and traffic may be used to dynamically control three mechanisms of adaptation, VM migration, overlay topology, and forwarding to increase performance of at least two classes of applications: bulk synchronous parallel (BSP) applications and transactional web ecommerce applications, for example.

To manage connections between machines and paths through a network, an adaptive virtual computing environment provides a layer 2 virtual network tool to project virtual machine network cards onto another network. Because the virtual network is a layer 2 network, a machine can be migrated from site to site without changing the presence of the machine on the network (i.e., the machine maintains the same IP address, routes, etc.).

An application running in some distributed computing environments must adapt to dynamically changing available computational and networking resources to achieve stable high performance. However, adaptation mechanisms and control tend to be both very application-specific and require considerable user or developer effort. Certain embodiments provide adaptation using automated, low-level, application-independent adaptation mechanisms made possible by virtual machines interconnected with a virtual network.

An adaptive virtual computing environment may measure the traffic load and application topology of virtual machines on the network. The adaptive virtual computing environment may monitor the underlying network and its topology. The environment may adapt an application according to VM traffic load and application topology to the network based on the monitored underlying network and topology. The environment may adapt the network to an application by taking advantage of resource reservation mechanisms. These services can be done on behalf of existing, unmodified applications and operating systems running on the virtual machines. FIG. 1 illustrates the steps and functionality discussed above in accordance with an embodiment of the present invention. For example, inference information 110, adaptation algorithms 120, and adaptation mechanisms 130 may combine for improved performance. Various information 110, algorithms 120, and mechanisms 130 will be described further below.

Further information regarding virtual computing environments and related inference and adaptation according to certain embodiments of the present invention may be found in A. Sundararaj, A. Gupta, and P. Dinda, Increasing Application Performance In Virtual Environments Through Run-time Inference and Adaptation, Proceedings of the 14th IEEE International Symposium on High Performance Distributed Computing (HPDC 2005), which is herein incorporated by reference in its entirety.

In certain embodiments, a system as embodied, for example, in Virtuoso allows migration of a VM from one physical host to another. VM migration may occur without modification or re-linking of an application and/or use of a particular operating system, for example. Using a VNET or other similar virtual network overlay topology component, a network overlay topology may be modified among a user's VMs at will. The VNET provides global control of the topology, for example. The VNET also allows modifying of message routing on the network overlay. Forwarding tables may be globally controlled, and topology and routing may be separated, for example.

In certain embodiments, VNET is an Ethernet layer, for example, virtual network tool that interconnects all the VMs of a user and creates an illusion that they are located on the user's local area network (LAN) by bridging the foreign LAN to a Proxy on the user's network. VNET makes available application independent adaptation mechanisms that can be used to automatically and dynamically optimize at run-time the performance of applications running inside of a user's VMs. The VTTIF component, integrated with VNET, may be used to monitor resource demands of the VMs. A passive network measurement tool may use naturally occurring traffic of existing, unmodified applications running inside of the VMs to measure characteristics of the underlying physical network. VRESERVE and VSched, the network and CPU reservation systems, respectively, may be used to reserve network and processor resources. An adaptation scheme matches an application's inferred resource (e.g., network and computation) demands to the measured available resources using adaptation mechanisms at hand such that some defined metric is optimized.

In certain embodiments, inferring application resource demands involves measuring the computational and network demands of applications running inside the virtual machines. Measuring available resources involves monitoring the underlying network and inferring its topology, bandwidth and latency characteristics, for example, as well as measuring availability of computational resources. Adaptation mechanisms at hand may include VM migration, virtual network topology and routing changes, CPU and network resource reservation, for example. One or more adaptation algorithms may be used to tie the monitoring, inference and adaptation mechanisms together. For example, a heuristic may be used to drive application-independent adaptation mechanisms, such as overlay topology and routing changes, while leveraging inferred application resource demands and measured resource information.

Various system components used in various embodiments will now be described in more detail below.

Virtuoso

Capabilities may be implemented using a system such as Virtuoso, a system for virtual machine grid computing that emulates the process of buying, configuring, and using a computer, such as an Intel-based computer, and/or collection of computers from a web site, for example. A Virtuoso system provides admission control of VMs and provides an ability for the system to adapt when a user cannot state his or her resource requirements. Virtuoso provides an ability to support a mode of operation in which VMs and other processes compete for resources.

Virtuoso serves as middleware for virtual machine distributed computing. The middleware emulates the process of buying, configuring, and using an Intel-based computer or collection of computers from a web site, a process with which many users and system administrators are familiar. Instead of a physical computer, the user receives a reference to the virtual machine which he/she can then use to start, stop, reset, and/or clone the machine. The system presents the illusion that the virtual machine is located next to the user in terms of console display, devices, and the network. A console display is sent back to the user's machine, a CD-ROM is proxied to the user's machine CD-ROM, and the VM appears to be plugged into the network side-by-side with the user's machine. The user can then install additional software, including operating systems. Virtuoso may be implemented, for example, using VMware GSX Server, a type-II virtual machine, as its virtual machine monitor (VMM), although other VMMs may be substituted, such as a type-I VMM.

Virtuoso middleware system is designed to support a wide range of workloads that its simple user-level abstraction makes possible. For example, the system can support interactive workloads which occur when using a remote VM to substitute for a desktop computer. These workloads include desktop applications, web applications and games, for example. The system can also support, for example, batch workloads, such as scientific simulations and/or analysis codes. These workloads are commonplace in grid computing, for example. The system may also support, for example, batch parallel workloads, such as scientific simulations and/or analysis codes that can be scaled by adding more VMs. These workloads are also commonplace in grid computing. In certain embodiments, workloads may be gang scheduled.

VNET

VNET creates and maintains a networking "illusion" in the system. That is, the VNET or virtual network overlay topology creates and maintains the illusion that the user's virtual machines are on the user's local area network (LAN), for example. Packet filters, packet sockets, and a networking interface, such as VMware's host-only networking interface may be used for creation and maintenance of the virtual network, for example. In certain embodiments, each physical machine that can instantiate virtual machines (a host) runs a single VNET daemon. One machine on the user's network also runs a VNET daemon (a proxy). In certain embodiments, one or more VMs may be instantiated on one or more hosts in the network.

Although VMware is provided as an exemplary virtual machine monitor (VMM), VNET can operate with any VMM that provides an externally visible representation of the virtual network interface. For example, VNET may be used without modification in conjunction with User Mode Linux and the VServer extension to Linux.

Figure 2:
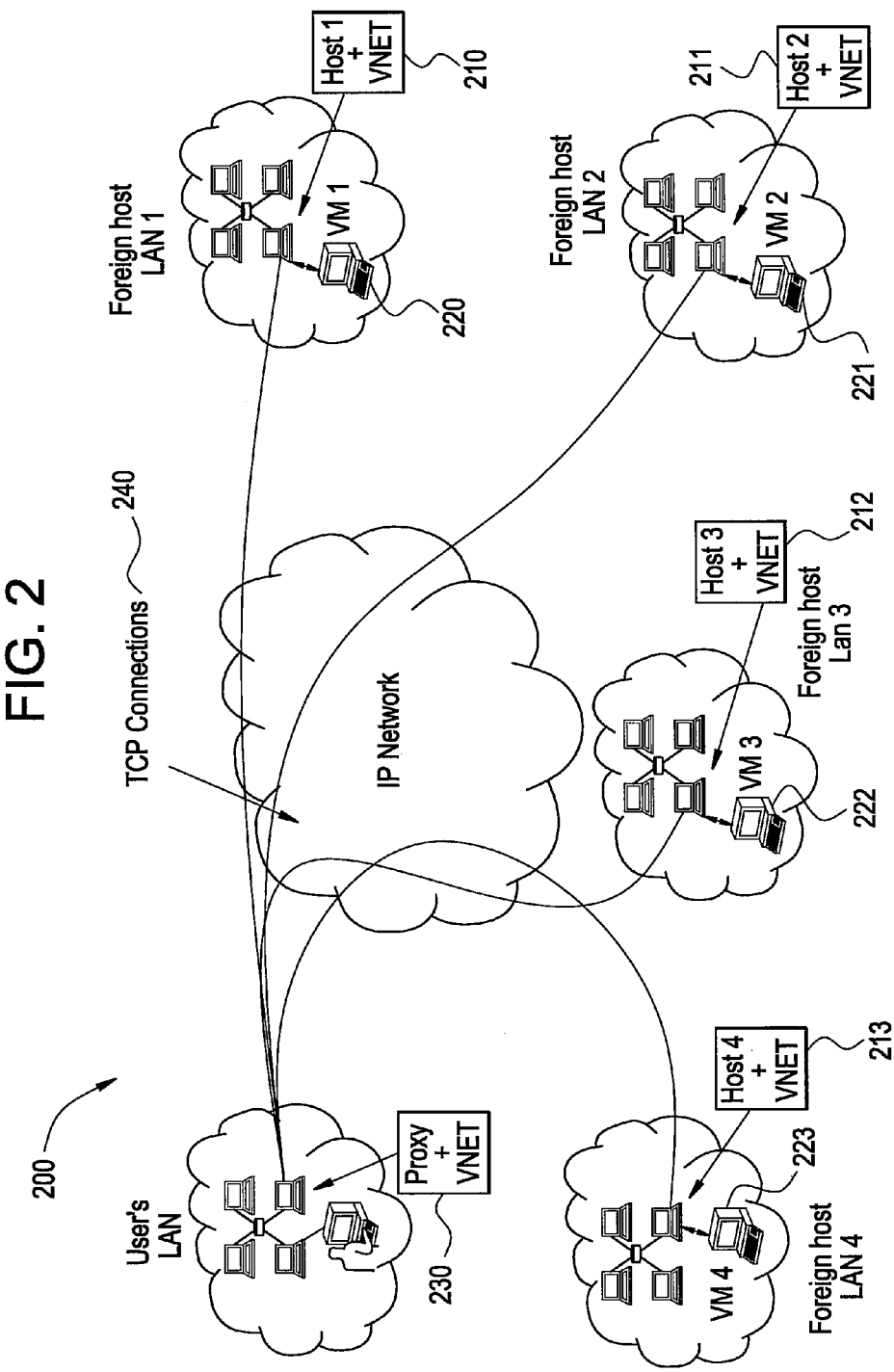
FIG. 2 shows a typical startup configuration of VNET for four hosts, each of which may support multiple VMs, in accordance with an embodiment of the present invention.

FIG. 2 shows a typical startup configuration of VNET 200 for four hosts 210-213, each of which may support multiple VMs 220-223, in accordance with an embodiment of the present invention. Each of the VNET daemons is connected by a transmission control protocol (TCP) connection (e.g., a VNET link) to the VNET daemon running on the Proxy 230, referred to as the resilient star backbone centered on the Proxy 230. Resilient indicates that it will always be possible to at least make these connections and reestablish them in the event of a failure. A communication mechanism between VMs 220-223 on host machines 210-213 can be exploited to provide VNET connectivity for a remote VM. For example, if a secure shell (SSH) connection can be made to the host, VNET traffic can be tunneled over the SSH connection.

The VNET daemons running on the hosts 210-213 and Proxy 230 open their virtual interfaces in promiscuous mode using Berkeley packet filters, for example. Each packet captured from the interface or received on a link is matched against a forwarding table to determine where to send the packet. For example, the packet may be sent over an outgoing link, written out to a local interface (such as by using libnet, which is built on packet sockets, available on both Unix and Windows), etc.

Figure 3:
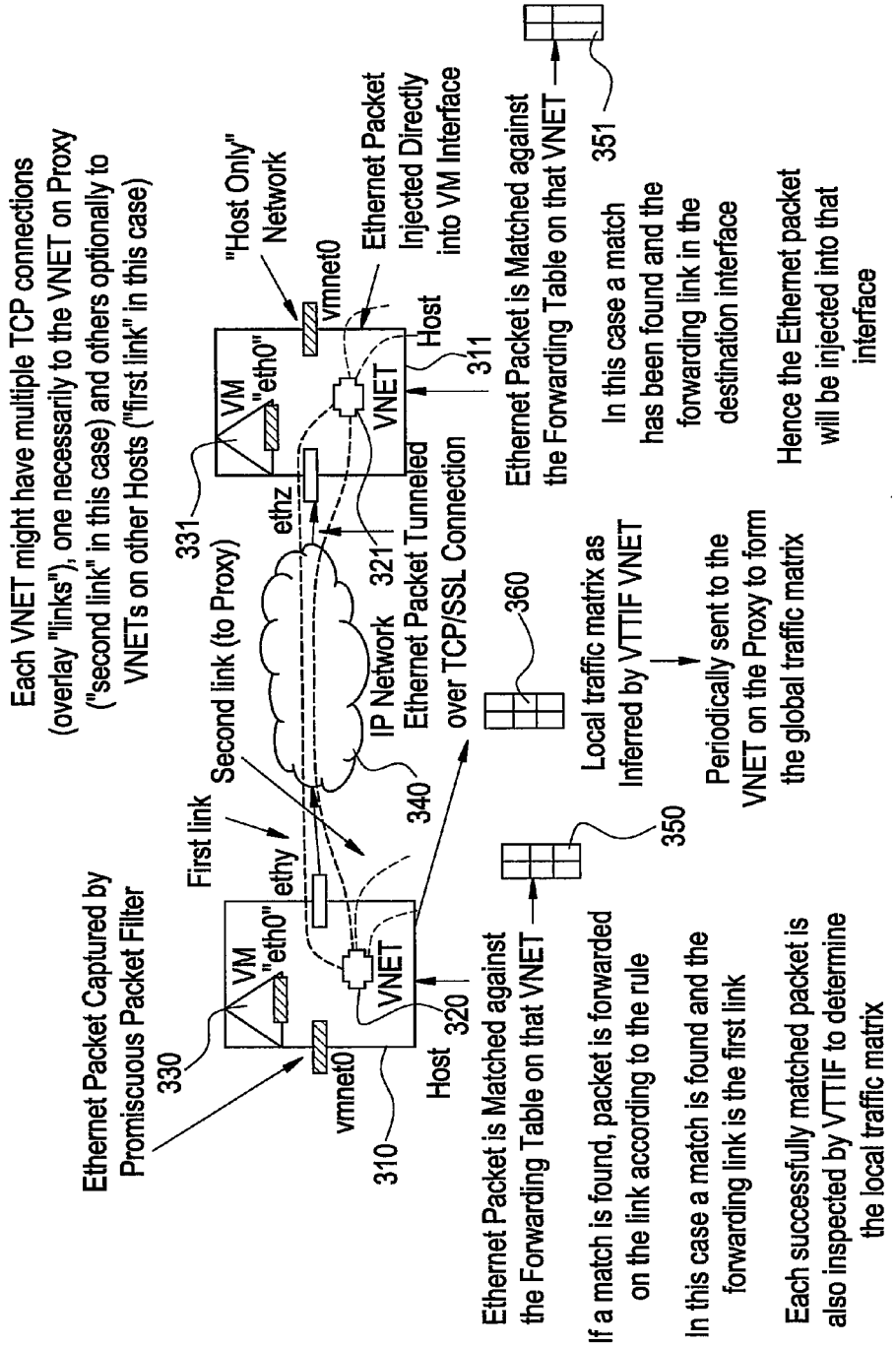
FIG. 3 illustrates the operation of a VNET link in accordance with an embodiment of the present invention.

FIG. 3 illustrates the operation of a VNET link 300 in accordance with an embodiment of the present invention. One or more hosts 310-311 on the link 300 include VNET 320-321 and VMs 330-331. Each VNET 320-321 may have multiple TCP and/or other protocol (e.g., UDP, etc.) connections (e.g., overlay "links"), one to the Proxy VNET (not shown here) and other optionally to VNETs 320-321 on other Hosts 310-311, for example. Packets are captured at a host 310-311 and matched against a forwarded table 350-351 on that VNET 320-321, for example. If a match is found, the packed is forwarded on the link according to the forwarding rule. Each successfully matched packet is also passed to VTTIF to determine a local traffic matrix 360. The Proxy, through its physical interface, provides a network presence for all the VMs 330-331 on the user's LAN 340 and makes their configuration a responsibility of the user and his/her site administrator, for example.

In certain embodiments, a star topology may be an initial configuration. Additional links and forwarding rules can be added or removed at any time. In the case of migration, the VM maintains its layer 2 and layer 3 network presence; neither a MAC nor an IP addresses changes, and the external network presence of the VM remains on the LAN of the Proxy.

Figure 4:
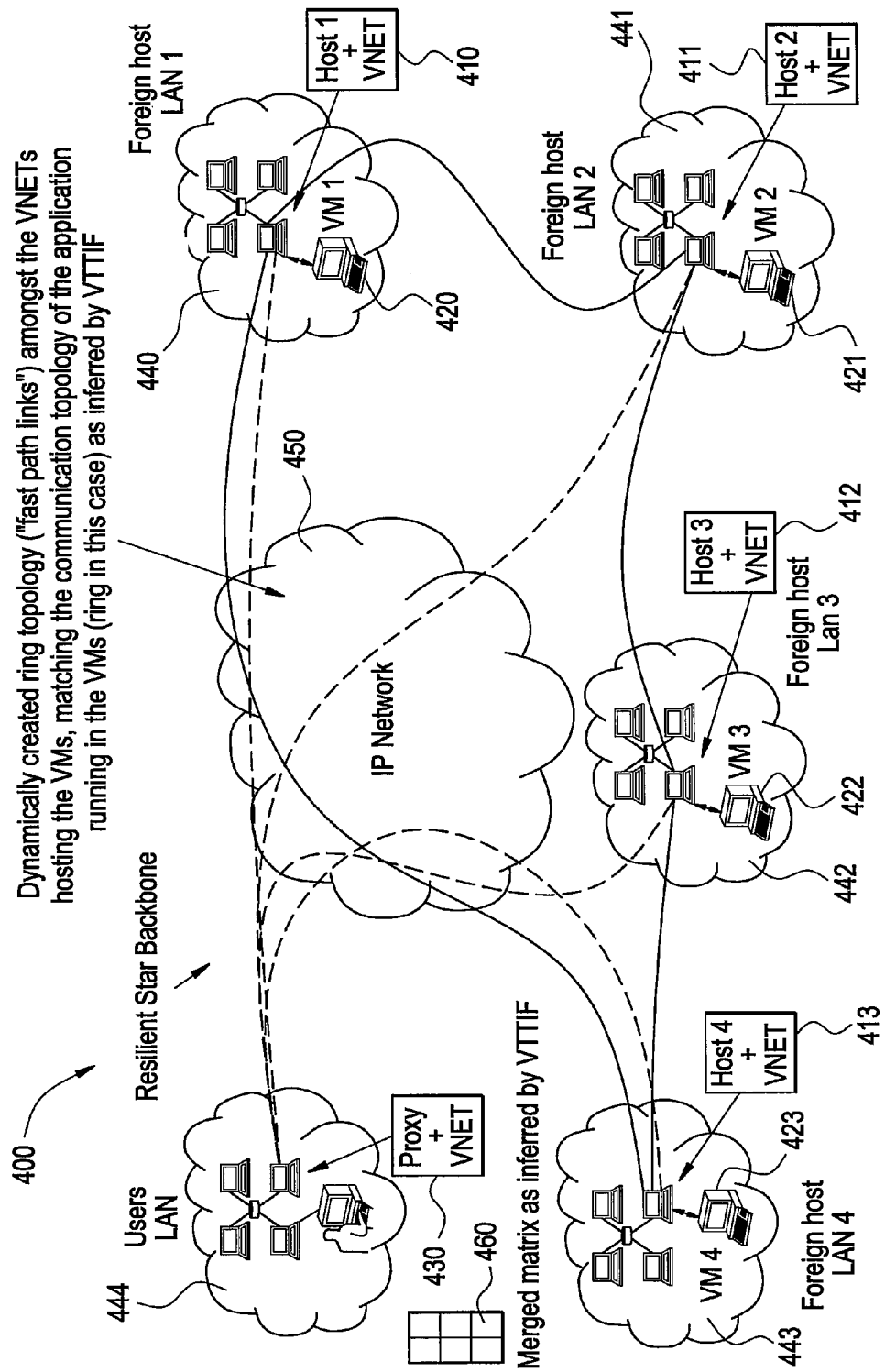
FIG. 4 shows a VNET configuration that has been dynamically adapted to reflect a topology change in accordance with an embodiment of the present invention.

FIG. 4 shows a VNET configuration 400 that has been dynamically adapted to reflect a topology change in accordance with an embodiment of the present invention. A dynamically created ring topology (e.g., "fast path links") among the VNETs 410-413 hosting the VMs 420-423 may be generated to match a communication topology of an application running in the VMs 420-423, as inferred by VTTIF 460. VTTIF infers a merged matrix 460 from monitored data to generate the topology (here, a ring) for machines 420-423 and LANs 440-443 on the network 450. The configuration 400 also includes a proxy 430 and user LAN 444, for example.

A VNET client can query any VNET daemon for available network interfaces, links, and forwarding rules. A VNET client can add or remove overlay links and forwarding rules. On initial startup, VNET calculates an upper bound on the time taken to configure itself (or change topology). This number is used to determine sampling and smoothing intervals in VTTIF, as described further below.

Building on primitives, a language has been developed to describe a VM-to-host mapping, topology, and forwarding rules, for example. A VNET overlay may be managed using scripts that generate or parse descriptions in that language. Using the VM-to-host language, certain embodiments allow a system to start up a collection of VNET daemons and establish an initial topology among them. Certain embodiments allow a system to fetch and display a current topology and VM mappings. Certain embodiments allow a system to fetch and display the route a packet will take between two Ethernet addresses. Certain embodiments compute differences between the current topology, forwarding rules, and mappings and a specified topology, forwarding rules, and mappings. Certain embodiments reconfigure the topology, forwarding rules, and VM mappings to match a specified topology, forwarding rules, and mappings. Certain embodiments fetch and display the current application topology using VTTIF, for example.

VTTIF

The Virtual Topology and Traffic Inference Framework (VTTIF) integrates with VNET to automatically infer the dynamic topology and traffic load of applications running inside the VMs in the Virtuoso system. Behavior of a bulk synchronous parallel (BSP) application may be inferred by observing the low level traffic sent and received by each VM in which it is running. Additionally, VTTIF's reactions may be smoothed so that adaptation decisions made on its output are less likely to lead to oscillation.

VTTIF works by examining each Ethernet packet that a VNET daemon receives from a local VM. VNET daemons collectively aggregate this information producing a global traffic matrix for all the VMs in the system. The application topology is then recovered from this matrix by applying normalization and pruning techniques, for example. Since the monitoring is done below the VM, the monitoring does not depend on the application or the operating system in any manner. VTTIF automatically reacts to interesting changes in traffic patterns and reports them, driving the adaptation process.

Figure 5:
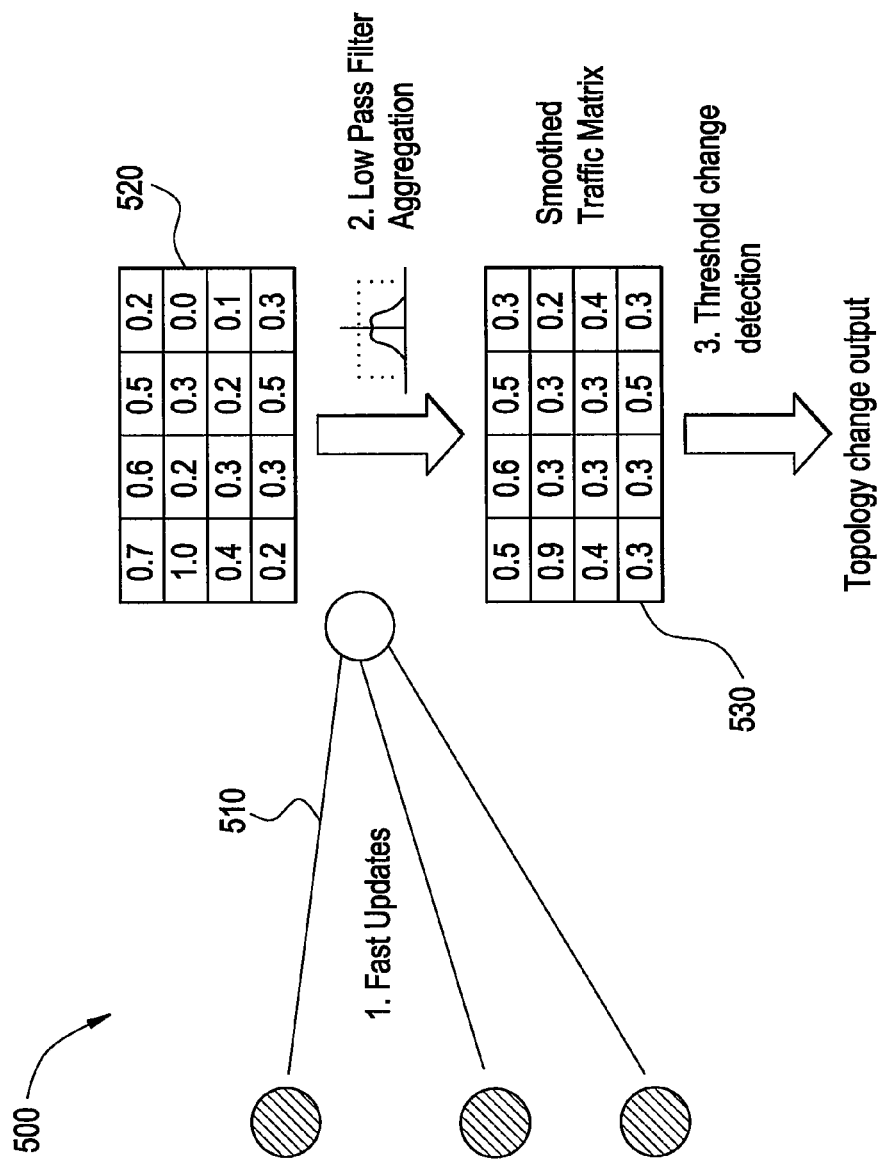
FIG. 5 illustrates an exemplary VTTIF in accordance with an embodiment of the present invention.

FIG. 5 illustrates an exemplary VTTIF 500 in accordance with an embodiment of the present invention. In certain embodiments, the VTTIF 500 receives information updates 510. Using a low pass filter, for example, information is aggregated 520 to form a smoothed traffic matrix. Then, a threshold change detection 530 determines a topology change output, for example.

Figure 6:
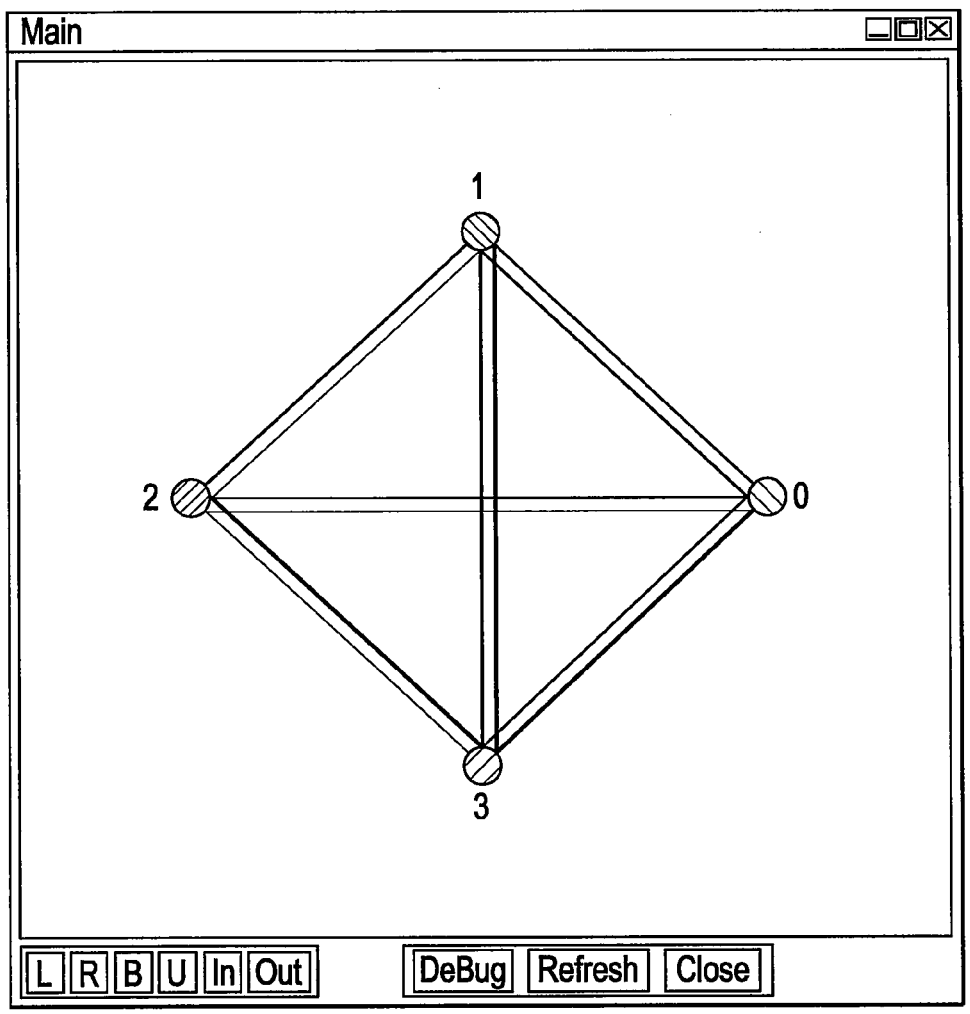
FIG. 6 shows a topology inferred by VTTIF from the NAS benchmark Integer Sort running on VMs.

VTTIF can accurately recover common topologies from both synthetic and application benchmarks like the PVM NAS benchmarks, for example. For example, FIG. 6 shows a topology inferred by VTTIF from the NAS benchmark Integer Sort running on VMs. The thickness of each link reflects the intensity of communication along the link. In certain embodiments, VTTIF runs continuously, updating its view of the network topology and traffic load matrix among a collection of addresses (e.g., Ethernet addresses) being support by VNET.

The reaction time of VTTIF depends on the rate of updates from the individual VNET daemons. VTTIF aggregates updates into a global traffic matrix. To provide a more stable view of dynamic changes, VTTIF applies a low pass filter to the updates, aggregates the updates over a sliding window, and bases decisions upon the aggregated view.

In certain embodiments, whether VTTIF reacts to an update by declaring that the topology has changed depends upon a smoothing interval and a detection threshold, for example. The smoothing interval is a sliding window duration over which the updates are aggregated. The smoothing interval depends on an adaptation time of VNET, which is measured at startup, and determines how long a change must persist before VTIIF notices. The detection threshold determines if a change in the aggregated global traffic matrix is large enough to declare a change in topology. In certain embodiments, after VTTIF determines that a topology has changed, the VTTIF will allow some time to settle, showing no further topology changes.

In certain embodiments, VTTIF is largely insensitive to the choice of detection threshold. However, this parameter does determine the extent to which similar topologies can be distinguished. Note that appropriate settings of VTTIP parameters are determined by the adaptation mechanisms, not by the particular application.

VADAPT

Virtuoso uses VTTIF to determine communication behavior of an application running in a collection of VMs and can leverage network monitoring techniques to determine the behavior of the underlying resources. The VNET overlay component also provides mechanisms for adapting an application to the network. Additionally, measurement of application performance and control of adaptation mechanisms in response to application and network behaviors may be provided.

In certain embodiments, a topology adaptation algorithm changes a network topology but does not move VMs. In other embodiments, a topology adaptation algorithm or series of algorithms may both adjust network topology and move VMs between physical hosts, for example.

Adaptation control algorithms are implemented using a system such as the VADAPT component of the Virtuoso system. Given a network traffic load matrix of an application and a computational intensity for the application in each VM, as well as the topology of the network and the load on its links, routers, and hosts, adaptation control seeks to determine a mapping of VMs to hosts, an overlay topology connecting the hosts, and forwarding rules regarding the topology that maximize application throughput. Additional information regarding VADAPT may be found in A. Sundararaj, M. Sanghi, J. Lange, and P. Dinda, An Optimization Problem in Adaptive Virtual Environments, Proceedings of the Seventh Workshop on Mathematical Performance Modeling and Analysis (MAMA 2005), June, 2005, Banff, Canada, and A. Sundararaj, M. Sanghi, J. Lange, P. Dinda, *Hardness of Approximation and Greedy Algorithms for the Adaptation Problem In Virtual Environments*, Technical Report NWU-EECS-06-06, Department of Electrical Engineering and Computer Science, Northwestern University, July, 2006, which are herein incorporated by reference in their entirety.

In certain embodiments, VADAPT uses greedy heuristic algorithms to determine such a VM-to-host mapping, overlay topology, and forwarding rules. VM migration and topology/forwarding rules changes provide adaptation mechanisms. Using greedy heuristic algorithms, VADAPT may adapt the VNET overlay topology to the communication behavior of an executing application. VTTIF infers an application communication topology to produce a traffic intensity matrix that is represented as an adjacency list, for example, where each entry describes communication between two VMs.

A topology adaptation algorithm may include generating a new list which represents a traffic intensity between VNET daemons that is implied by the VTTIF list and a current mapping of VMs to hosts. The list may be ordered by decreasing traffic intensity. Links are established in order until c links have been established. The cost constraint c may be supplied by a user and/or system administrator, for example. The cost constraint can also be specified as a percentage of total intensity reflected in the inferred traffic matrix, or as an absolute limit on bandwidth, for example.

FIG. 4 illustrates a topology adaptation in accordance with an embodiment of the present invention. As shown in FIG. 4, an application configured with neighbor exchange on a ring application topology of four VMs 420-423 starts executing with a VNET star topology (illustrated by dotted lines) centered on the Proxy 430. VTTIF infers the topology 460 and in response VADAPT tells VNET to add four links (illustrated by dark lines) to form an overlay ring among the VNET daemons 410-413, thus matching the application's topology, for example.

Added links may be referred to as fast path topology, as these links may lead to faster communication between application components. Added links may be of different types (e.g., TCP, UDP, STUN, HTTP, SOAP, etc.) depending upon security policies of the two sites. Some links may be more costly than others. For example, links that support reservations may be more costly than those that do not. Not all desired links may be possible given operating conditions.

VADAPT uses a greedy heuristic algorithm to map virtual machines onto physical hosts. As described above, VADAPT uses the application communication behavior as captured by VTTIF and expressed as an adjacency list as input. In addition, throughput estimates may be used between each pair of VNET daemons arranged in decreasing order. A VADAPT mapping algorithm may include, for example, generating a new list which represents a traffic intensity between VNET daemons that is implied by the VTTIF list and the current mapping of VMs to hosts. The VM adjacency list is ordered by decreasing traffic intensity. The VNET daemon adjacency list is ordered by decreasing throughput. A first pass is made over the VM adjacency list to locate non-overlapping pairs of communicating VMs, which are mapped greedily to the first pair of VNET daemons in the VNET daemon adjacency list which currently have no VM mappings. At the end of the first pass, there should be no pair of VMs on the list for which neither VM has been mapped. A second pass is made over the VM adjacency list to locate, in order, all VMs that have not been mapped onto a physical host. These unmapped VMs are "stragglers". For each straggler VM, the VM is mapped in VM adjacency list order to a VNET daemon such that a throughput estimate between the VM and its already mapped counterpart is increased or maximized. Differences between the current mapping and the new mapping are computed, and migration instructions are issued to achieve the new mapping.

Once VADAPT determines the overlay topology, forwarding rules may be computed using an all pairs shortest paths algorithm, for example, with each edge weight corresponding to a total load on an edge from paths that have been determined. This spreads traffic out to improve network performance, for example.

In certain embodiments, when algorithms are combined, the migration algorithm is first run to map the VMs to VNET daemons. Next, the overlay topology is determined based on that mapping. Finally, the forwarding rules are computed.

In certain embodiments, the inference tool, VTTIF, the adaptation mechanisms of VNET, and the adaptation algorithms of VADAPT may be used to help increase performance of existing, unmodified BSP applications running in a VM environment such as Virtuoso. Adaptation may be sensitive to the nature of the application, and different or multiple adaptation mechanisms may be needed to increase performance. The inference capabilities of tools like VTTIF may help to guide adaptation so that maximum or improved benefit can be derived for the application. VADAPT may help performance in virtual networks of both parallel and non-parallel applications.

VSCHED

A virtual machine scheduler (VSched) schedules a collection of VMs on a host according to a model of independent periodic real-time tasks. Tasks can be introduced or removed from control at any point in time through a client/server interface, for example. Virtuoso uses this interface to enforce compute rate and interactivity commitments a provider has made to a VM, for example. Further detail regarding certain embodiments of VSched may be found in B. Lin, and P. Dinda, VSched: Mixing Batch and Interactive Virtual Machines Using Periodic Real-time Scheduling, Proceedings of ACM/IEEE SC 2005 (Supercomputing), November, 2005, which is herein incorporated by reference in its entirety.

A periodic real-time model may be used as a unifying abstraction that can provide for the needs of the various classes of applications described above. In a periodic realtime model, a task is run for a certain slice of seconds in every period of seconds. The periods may start at time zero, for example. Using an earliest deadline first (EDF) schedulability analysis, the scheduler can determine whether some set of (period, slice) constraints can be met. The scheduler then uses dynamic priority preemptive scheduling based on deadlines of the admitted tasks as priorities.

In certain embodiments, VSched offers soft, rather than hard, real-time guarantees. VSched may accommodate periods and slices ranging from microseconds, milliseconds and on into days, for example. In certain embodiments, a ratio slice/period defines a compute rate of a task. In certain embodiments, a parallel application may be run in a collection of VMs, each of which is scheduled with the same (period, slice) constraint. If each VM is given the same schedule and starting point, then they can run in lock step, avoiding synchronization costs of typical gang scheduling.

In certain embodiments, direct user feedback may be incorporated in scheduling interactive applications running in VMs. For example, a single "irritation button" feedback mechanism may be used to control VM priority. In certain embodiments, period, slice user feedback provide finer-grained, two-dimensional control. In certain embodiments, VM constraints may be changed quickly via VSched so that an interactive user can improve his/her VM's performance relatively quickly or have the system migrate the VM to another physical machine if the desired (period, slice) is not possible or feasible on the original machine.

In certain embodiments, VSched is a user-level program that runs on an operating system, such as Linux, and schedules other operating system processes. For example, VSched may be used to schedule VMs, such as VMs created by VMware GSX Server. GSX is a type-II virtual machine monitor, meaning that it does not run directly on the hardware, but rather on top of a host operating system (e.g., Linux). A GSX VM, including all of the processes of the guest operating system running inside, appears as a process in Linux, which is then scheduled by VSched.

While type-11 VMMs are the most common on today's hardware, and VSched's design lets it work with processes that are not VMs, periodic real-time scheduling of VMs can also be applied in type-I VMMs. A type-I VMM runs directly on the underlying hardware with no intervening host operating system. In this case, the VMM schedules the VMs it has created just as an operating system would schedule processes. Just as many operating systems support the periodic realtime model, so can type-I VMMs.

In certain embodiments, for example, VSched uses an earliest-deadline-first (EDF) algorithm schedulability test for admission control and uses EDF scheduling to meet deadlines. In certain embodiments, VSched is a user-level program that uses fixed priorities within, for example, Linux's SCHED_FIFO scheduling class and SIGSTOP/SIGCONT to control other processes, leaving aside some percentage of CPU time for processes that it does not control. By default, VSched is configured to be work-conserving for the real-time processes it manages, allowing them to also share these resources and allowing non real-time processes to consume time when the realtime processes are blocked.

In certain embodiments, VSched includes a parent and a child process that communicate via a shared memory segment and a pipe. As described above, VSched may employ one or more priority algorithms such as the EDF dynamic priority algorithm discussed above. EDF is a preemptive policy in which tasks are prioritized in reverse order of the impending deadlines. The task with the highest priority is the one that is run first. Given a system of n independent periodic tasks, a fast algorithm may be used to determine if the n tasks, scheduled using EDF, will all meet their deadlines:

$$U(n) = \sum_{k=1}^{n} \frac{slice_k}{period_k} \leq 1, \tag{1}$$

where U(n) is the total utilization of the task set being tested.

Three scheduling policies are supported in the current Linux kernel, for example: SCHED_FIFO, SCHED_RR and SCHED_OTHER. SCHED_OTHER is a default universal time-sharing scheduler policy used by most processes. It is a preemptive, dynamic-priority policy. SCHED_FIFO and SCHED_RR are intended for special time-critical applications that need more precise control over the way in which runnable processes are selected for execution. Within each policy, different priorities can be assigned, with SCHED_FIFO priorities being higher than SCHED_RR priorities which are in turn higher than SCHED_OTHER priorities, for example. In certain embodiments, SCHED_FIFO priority 99 is the highest priority in the system, and it is the priority at which the scheduling core of VSched runs. The server front-end of VSched runs at priority 98, for example.

SCHED_FIFO is a simple preemptive scheduling policy without time slicing. For each priority level in SCHED_FIFO, a kernel maintains a FIFO (first-in, first-out) queue of processes. The first runnable process in the highest priority queue with any runnable processes runs until it blocks, at which point the process is placed at the back of its queue. When VSched schedules a VM to run, VSched sets the VM to SCHED_FIFO and assigns the VM a priority of 97, just below that of the VSched server front-end, for example.

In certain embodiments, the following rules are applied by the kernel. A SCHED_FIFO process that has been preempted by another process of higher priority will stay at the head of the list for its priority and will resume execution as soon as all processes of higher priority are blocked again. When a SCHED_FIFO process becomes runnable, it will be inserted at the end of the list for its priority. A system call to sched_setscheduler or sched_setparam will put the SCHED_FIFO process at the end of the list if it is runnable. A SCHED_FIFO process runs until the process is blocked by an input/output request, it is preempted by a higher priority process, or it calls sched_yield.

In certain embodiments, after configuring a process to run at SCHED_FIFO priority 97, the VSched core waits (blocked) for one of two events using a select system call. VSched continues when it is time to change the currently running process (or to run no process) or when the set of tasks has been changed via the front-end, for example.

By using EDF scheduling to determine which process to raise to highest priority, VSched can help assure that all admitted processes meet their deadlines. However, it is possible for a process to consume more than its slice of CPU time.

By default, when a process's slice is over, it is demoted to SCHED_OTHER, for example. VSched can optionally limit a VM to exactly the slice that it requested by using the SIGSTOP and SIGCONT signals to suspend and resume the VM, for example.

Figure 7:
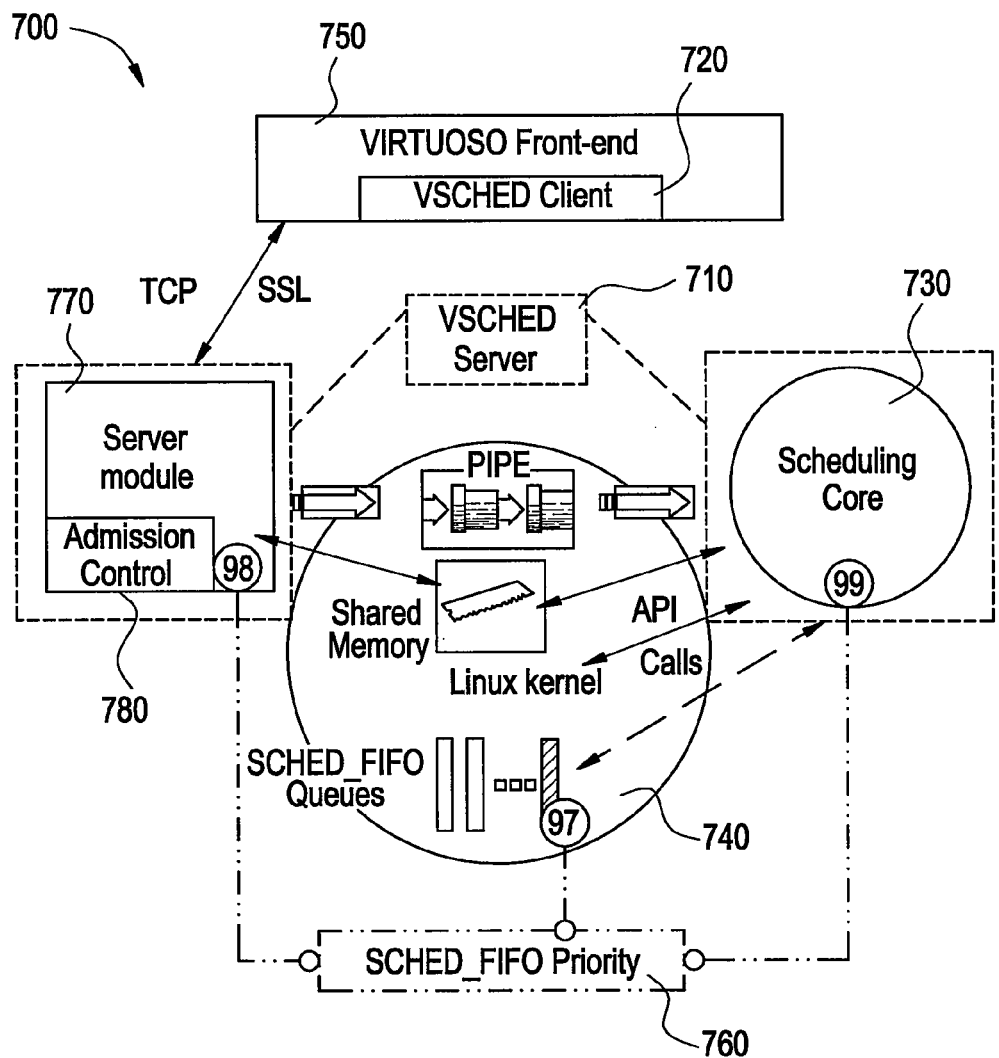
FIG. 7 illustrates a virtual scheduling system according to an embodiment of the present invention.

In certain embodiments, VSched 700 includes a server 710 and a client 720, as shown in FIG. 7. The VSched server 710 is a daemon running on, for example, a Linux kernel 740 that spawns the scheduling core 730, which executes the scheduling scheme described above. The VSched client 720 communicates with the server 710 over a TCP connection that is encrypted using SSL. Authentication is accomplished by a password exchange, for example. In certain embodiments, the server 710 communicates with the scheduling core 730 through two mechanisms. First, the server 710 and the scheduling core 730 share a memory segment which contains an array that describes the current tasks to be scheduled as well as their constraints. Access to the array may be guarded via a semaphore, for example. The second mechanism is a pipe from server 710 to core 730. The server 710 writes on the pipe to notify the core 730 that the schedule has been changed.

In certain embodiments, using the VSched client 720, a user can connect to the VSched server 710 and request that any process be executed according to a period and slice. Virtuoso keeps track of the process ids (pids) used by its VMs. For example, a specification (3333, 1000 ms, 200 ms) would mean that process 3333 should be run for 200 ms every 1000 ms. In response to such a request, the VSched server 710 determines whether the request is feasible. If it is, the VSched server 710 will add the process to the array and inform the scheduling core 730. In either case, the server 710 replies to the client 720.

VSched allows a remote client to find processes, pause or resume them, specify or modify their real-time schedules, and return them to ordinary scheduling, for example. Any process, not just VMs, can be controlled in this way.

VSched's admission control algorithm is based on Equation 1, the admissibility test of the EDF algorithm. In certain embodiments, a certain percentage of CPU time is reserved for SCHED_OTHER processes. The percentage can be set by the system administrator when starting VSched, for example.

In certain embodiments, the scheduling core is a modified EDF scheduler that dispatches processes in EDF order but interrupts them when they have exhausted their allocated CPU time for the current period. If so configured by the system administrator, VSched may stop the processes at this point, resuming them when their next period begins.

When the scheduling core receives scheduling requests from the server module, it may interrupt the current task and make an immediate scheduling decision based on the new task set, for example. The scheduling request can be a request for scheduling a newly arrived task or for changing a task that has been previously admitted, for example.

Thus, certain embodiments use a periodic real-time model for virtual-machine-based distributed computing. A periodic real-time model allows mixing of batch and interactive VMs, for example, and allows users to succinctly describe their performance demands. The virtual scheduler allows a mix of long-running batch computations with fine-grained interactive applications, for example. VSched also facilitates scheduling of parallel applications, effectively controlling their utilization while limiting adverse performance effects and allowing the scheduler to shield parallel applications from external load. Certain embodiments provide mechanisms for selection of schedules for a variety of VMs, incorporation of direct human input into the scheduling process, and coordination of schedules across multiple machines for parallel applications, for example.

Optical Networks

Figure 8:
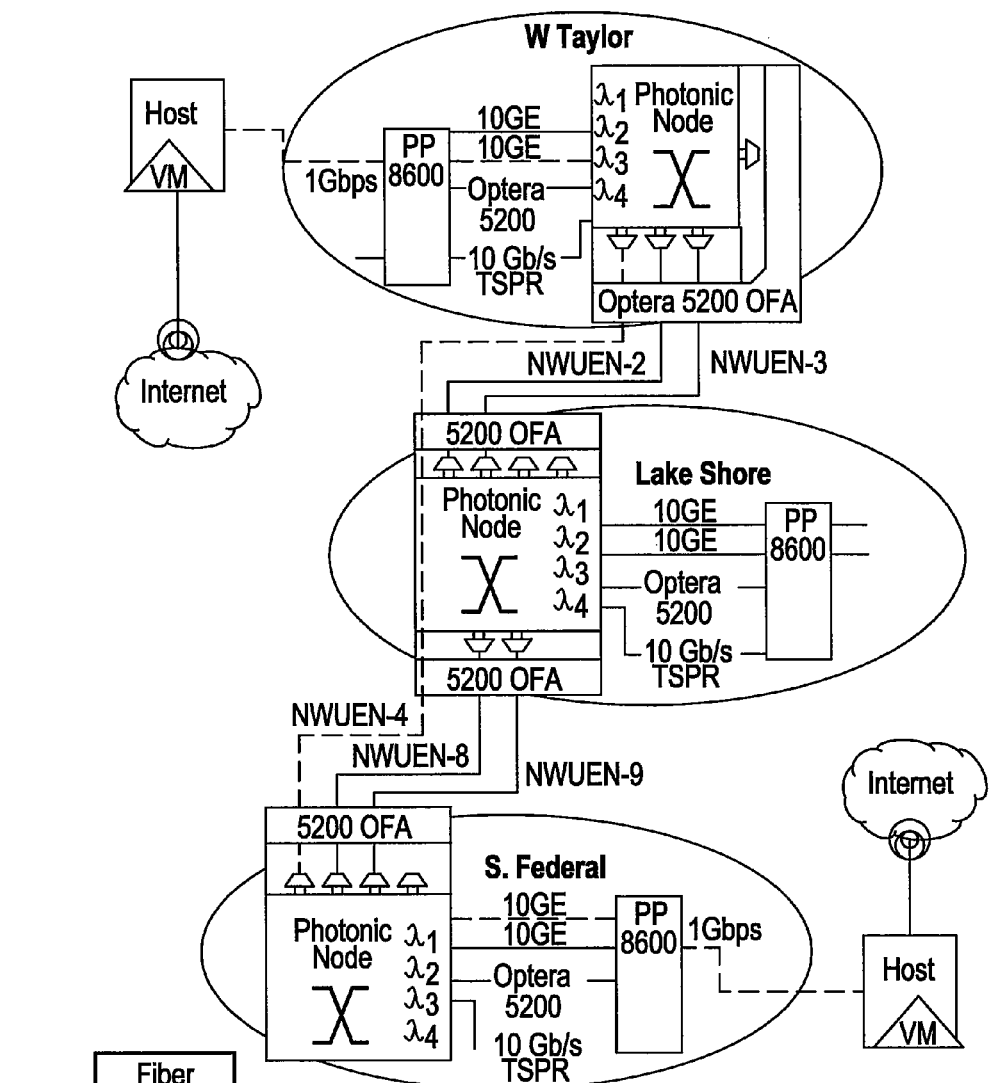
FIG. 8 illustrates an exemplary topology of an OMNInet network in accordance with an embodiment of the present invention.

In certain embodiments, optical channels may be created between nodes in an optical network, similar to dynamically creating overlay networks as described above. Rather than creating an overlay network on top of an existing Internet infrastructure, a dedicated light path may be requested from an optical network reservation system. For example, certain embodiments may be used with ODIN, a set of optical network services, including provisioning capabilities, integrated into OMNInet, an experimental circuit switched optical network. FIG. 8 illustrates an exemplary physical topology of an OMNInet network 800. VTTIF may be used to monitor an application, and ODIN requests may be generated based on an inferred topology and traffic load matrix, for example.

VRESERVE

A reservation component, VRESERVE, alleviates the reservation responsibility for both the user and the developer, for example. In certain embodiments, by automatically requesting network reservations at run-time, applications have been enabled to transparently and painlessly use dedicated high speed reservable networks to increase communication performance. Additional information regarding VRESERVE according to certain embodiments may be found in J. Lange, A. Sundararaj, and P. Dinda, Automatic Dynamic Run-time Optical Network Reservations, Proceedings of the 14th IEEE International Symposium on High Performance Distributed Computing (HPDC 2005), which is herein incorporated by reference in its entirety.

In certain embodiments, in an optical network, for example, after VNET has decided which overlay links to create, but before VNET has created the links, VRESERVE analyzes each link to determine if the link can be better served using a reservation. For example, VRESERVE may analyze a mapping of default (e.g., commodity Internet) interfaces (e.g., identified by IP addresses) to interfaces that are connected to a reservable network. If both endpoints of the link share a mapping to the same reservable network, VRESERVE initiates a reservation request for the path between the two corresponding interfaces. If the request succeeds, VADAPT configures the overlay link to use the reserved path. If not successful, the overlay link runs over a path in the commodity Internet, for example.

In certain embodiments, an overlay link is created on top of a reserved path. The overlay link allows use of VNET to perform routing without modifying a host machine's routing tables or rewriting packet headers. With the overlay in place, however, routing may be performed transparently.

In certain embodiments, VRESERVE may be implemented as a Perl module, for example, imported by VNET that implements a procedural interface for the creation and destruction of optical lightpaths, for example. VRESERVE also tracks changes to the reservable network's state made by a caller. Network reservations are made by interfacing directly to ODIN or other optical network resource. Network resources may include one or more of a processor (e.g., a central processing unit), a memory, throughput (bytes/second), etc. For example, ODIN includes a server running on a trusted host and a command-line client. VRESERVE constructs and executes command lines, for example. Because ODIN does not support deferred scheduling, VRESERVE indicates success or failure in creating a lightpath. Although VRESERVE is described herein primarily in connection with lightpaths, such discussion is for purposes of illustration only, and VRESERVE may be applied to schedule a variety of different networks, such as packet switched and/or circuit switched networks.

Figure 9:
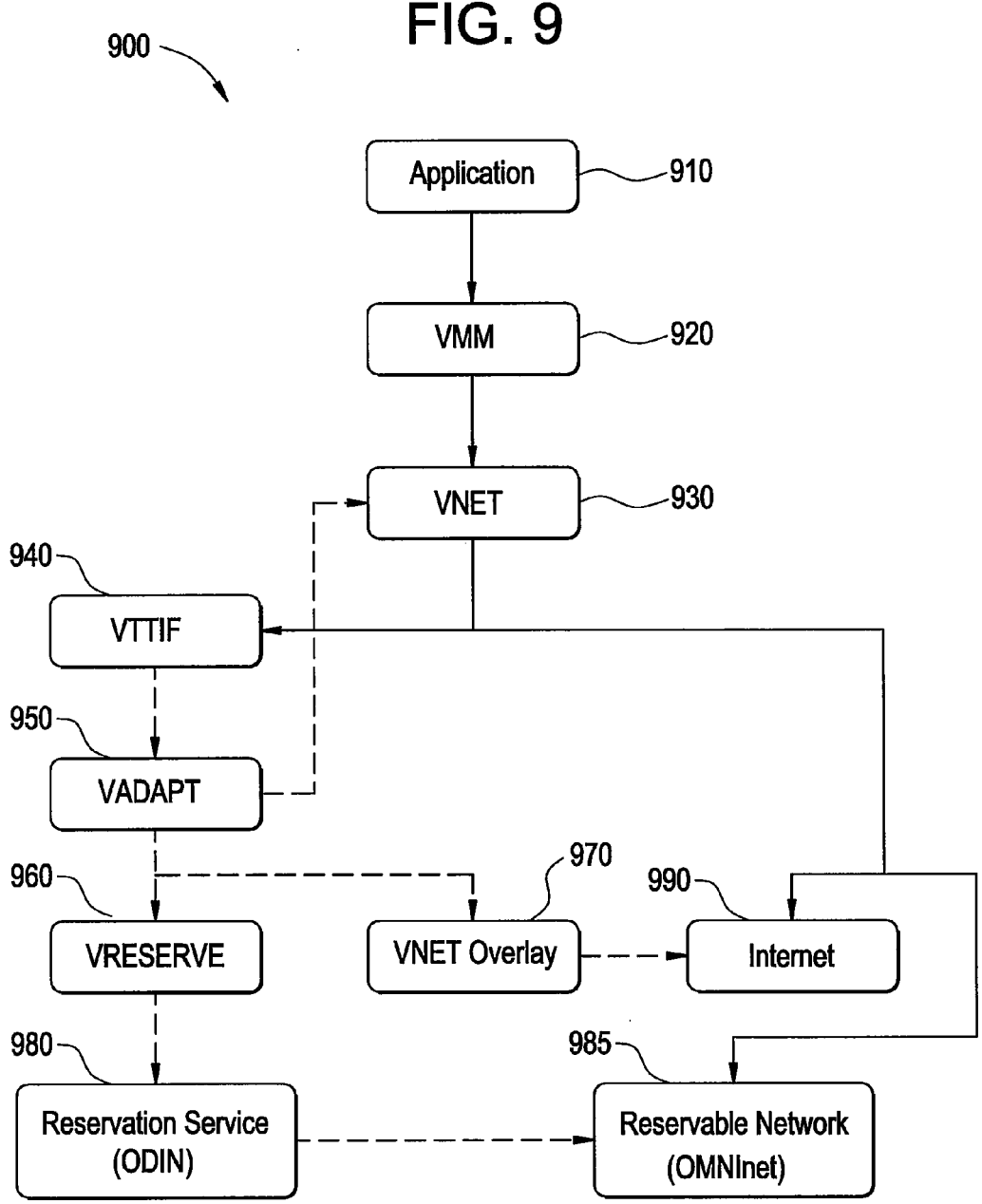
FIG. 9 shows an exemplary optical network system overview in accordance with an embodiment of the present invention.

An exemplary system overview 900 including an application 910, VMM 920, VNET 930, VTTIF 940, VADAPT 950, VRESERVE 960, and network is shown in FIG. 9. Each Ethernet packet sent by the application 910 is diverted by the virtual machine monitor 920 into the VNET overlay network system 970. VNET 930, 970 forwards the packet on an overlay link, which may either be realized over the commodity Internet 990, or through a network 980, 985 that supports reservations (e.g., OMNInet), for example. VNET 930 also supplies the packet to the inference system 940, VTTIF, for inspection. Local VTTIF agents collect data on each host and regularly aggregate the information on each remote VTTIF instance. A lead VTTIF constructs an estimate of the global application topology among its VMs and the corresponding traffic load matrix. The estimated topology is passed to the adaptation system, VADAPT 950.

VADAPT 950 attempts to improve application performance using a variety of adaptation mechanisms. One mechanism is to create new overlay links and corresponding overlay forwarding rules. After VADAPT 950 has chosen a set of new overlay links, it passes the links to VRESERVE 960, which creates lightpaths for one or more links. For each new light path thus created, VADAPT 950 then changes the forwarding rules to send the data for the link over the lightpath instead of the commodity Internet.

An exemplary execution scenario of the above system is as follows. A set of virtual machines V are started on a distributed set of hosts. A VNET star topology is created, with a proxy machine p, to enable communication for every VM in V. A parallel application is then executed inside each VM in V. All inter-VM communication is routed through p, and a traffic matrix is aggregated by VTTIF. From that matrix, VTTIF derives a communication topology among the VMs in V. VADAPT uses this topology, combined with a mapping of VMs to hosts, to define a better topology amongst the VNET daemons. This topology consists of a set of overlay links E. A number k links with the highest bandwidth requirements are chosen from E and placed in H, where $H \subseteq E$. VADAPT passes H to VRESERVE for action.

VRESERVE analyzes H and determines a subset of overlay links R for which reservations are possible. VRESERVE then requests reservations for each overlay link in R. Links that suffer from path reservation failure are removed from R. VNET then creates an overlay network. Creation of the overlay network is accomplished by creating an overlay link for each element in H and adjusting the forwarding rules to send packets over the reserved paths for the links in R and over the commodity Internet for H–R. As the communication pattern changes, a new set H' is created by VADAPT and passed to VNET. VNET and VRESERVE process the new links as before, generating an overlay network of H∪H'. However, following the creation process VNET finds a difference H–H', which corresponds to links not needed in the new topology. VNET then removes those links, as well as any reservations allocated to links in H–H'.

Because VTTIF can provide a holistic view of an application, an entire topology and traffic matrix at once rather than a link at a time, an optical, as well as other electrical, network reservation system to exploit this higher level, detailed information to schedule reservations across an entire network collectively together with time-driven scheduling of VMs, global communication, and computation context switches, for example.

Wren

The adaptive virtualized computing environment described herein in various embodiments and/or similar systems, can be interfaced with many monitoring systems, such as William and Mary's Wren monitoring tool, and monitoring information is used for network adaptation. Additionally, an application's own traffic (e.g., a VM's own packets) may be monitored to infer network information. Further information regarding certain embodiments of a monitoring tool may be found in A. Gupta, M. Zangrilli, A. Sundararaj, P. Dinda, and B Lowekamp, Free Network Measurement for Adaptive Virtualized Distributed Computing, Proceedings of the 20th International Parallel and Distributed Processing Symposium (IPDPS 2006), April, 2006, which is herein incorporated by reference in its entirety.

In certain embodiments, the adaptive reservation system described above may be used in conjunction with a monitoring and analysis system, such as the Wren passive monitoring and analysis system, to improve virtual network adaptation. The monitor's physical network level information may be used by adaptation algorithms to choose VM-to-host mappings, overlay topology, and forwarding rules, for example.

Figure 10:
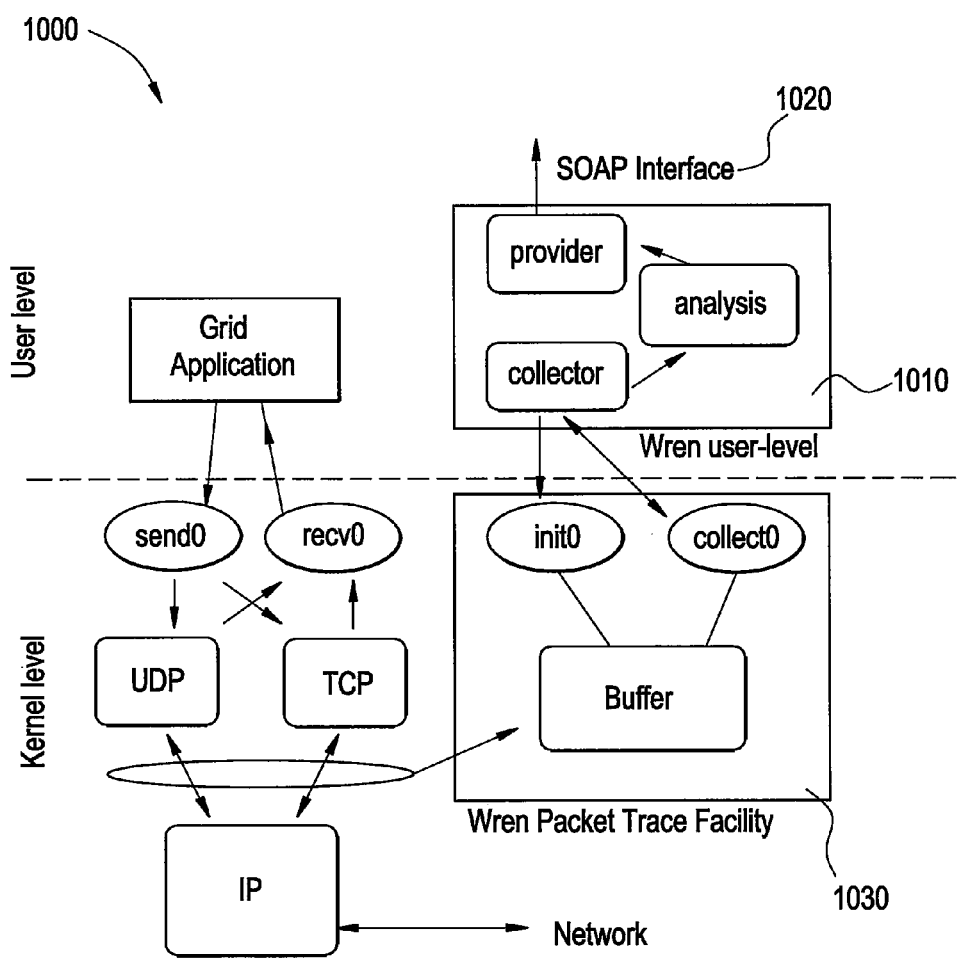
FIG. 10 illustrates an exemplary Wren monitoring architecture according to an embodiment of the present invention.

An exemplary Wren monitoring architecture 1000 is shown in FIG. 10. Wren uses is kernel-level packet trace collection to allow precise timestamps of the arrival and departure of packets on machines in the network. Timestamp precision allows a passive available bandwidth algorithm to observe behavior of small groups of packets on the network. A user-level component 1010 collects traces from the kernel 1030, for example. Run-time analysis determines available bandwidth, and measurements are reported to other applications through a Simple Object Access Protocol or Service Oriented Architecture Protocol (SOAP) interface 1020. Alternatively, the packet traces can be filtered for useful observations and transmitted to a remote repository for analysis. Even when an application is not saturating the network, the application may be sending bursts of traffic that can be used to measure the available bandwidth of the network.

An analysis algorithm used by Wren is based on a self-induced congestion (SIC) algorithm, for example. Active implementations of this algorithm generate trains of packets at progressively faster rates until increases in one-way delay are observed, indicating queues building along the path resulting from the available bandwidth being consumed. Passively collected traces may be similarly analyzed to identify appropriate trains from a stream of packets generated by a TCP sending algorithm, for example.

In certain embodiments, online Wren groups outgoing packets into trains by identifying sequences of packets with similar interdeparture times between successive pairs. The tool searches for maximal-length trains with consistently spaced packets and calculates an initial sending rate (ISR) for those trains. After identifying a train, an acknowledgement (ACK) return rate is calculated for matching ACKs. An available bandwidth is determined by observing the ISR at which the ACKs show an increasing trend in round trip times (RTTs), indicating congestion on the path.

Available bandwidth observations are passed to a Wren observation thread. The observation thread provides a SOAP interface that clients can use to receive the stream of measurements produced using application traffic. Because the trains are short and represent only a single observation of an inherently bursty process, multiple observations may be used to converge to a more accurate measurement of available bandwidth.

Virtuoso Adaptive Virtual Computing System

Figure 11:
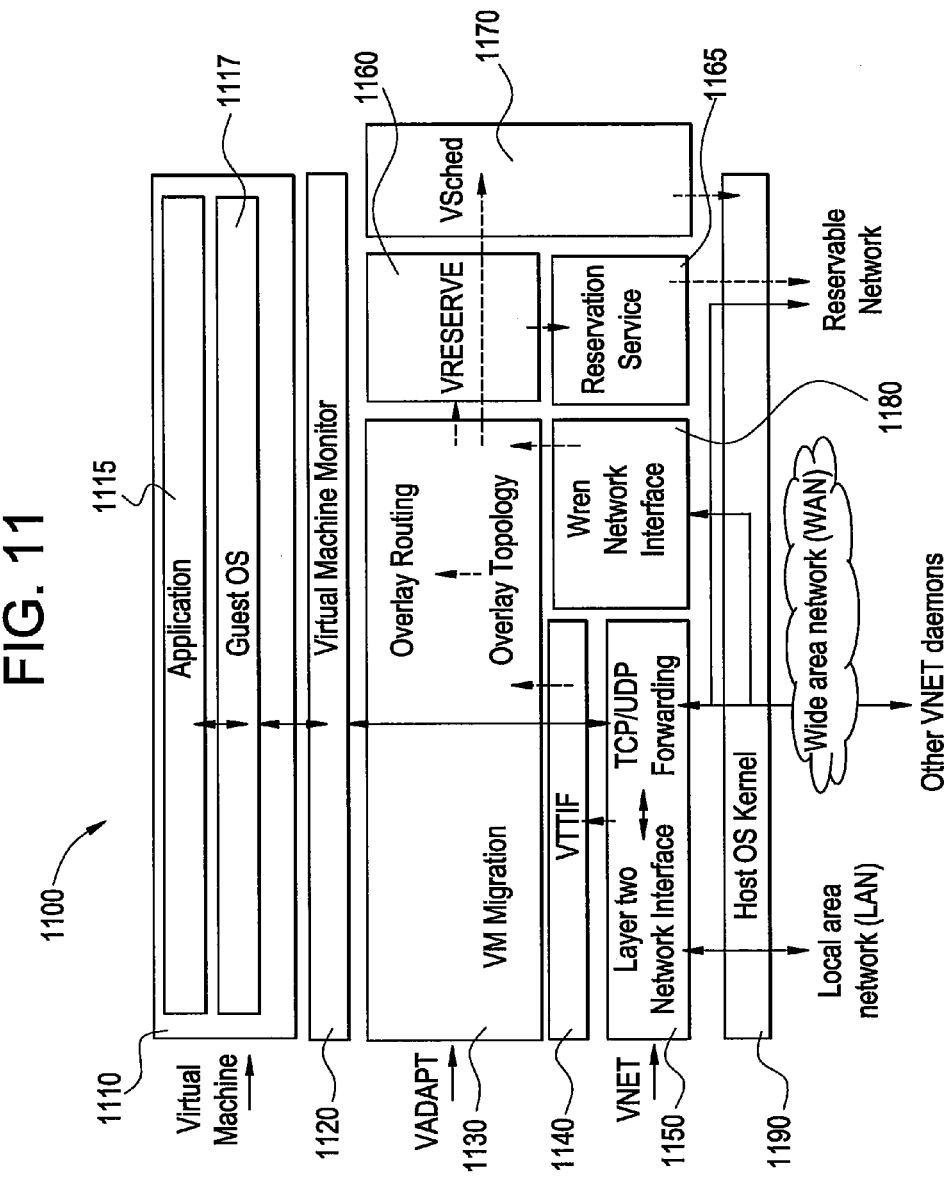
FIG. 11 illustrates a system for virtual machine distributed computing in accordance with an embodiment of the present invention.

In certain embodiments, the Virtuoso system 1100 for virtual machine distributed computing includes virtual machines 1110 are interconnected with VNET 1150, a virtual overlay network. The VTTIF (virtual traffic and topology inference framework) component 1140 observes packets sent by a VM 1110 and infers from this traffic a global communication topology and traffic load matrix among a collection of VMs 1110. Wren 1180 uses the traffic generated by VNET 1150 to monitor the underlying network and makes its measurements available to Virtuoso's adaptation framework 1130, as seen in FIG. 11. VRESERVE 1160 (with or without an associated registration service 1165) and/or VSched 1170 may be used to reserve network resources for an application 1115 based on topology and routing information, for example. Network resources may include one or more processors (e.g., central processing units), memory, throughput (bytes/second), etc.

Virtuoso and Wren are integrated by incorporating Wren extensions into a host operating system of the machines running VNET. In this position, Wren monitors the traffic between VNET daemons, not between individual VMs.

In certain embodiments, a local instance of Wren is made visible to Virtuoso through its SOAP interface. VTTIF executes non-blocking calls to Wren to collect updates on available bandwidth and latency from the local host to other VNET hosts. VTTIF uses VNET to periodically send local matrices to the Proxy machine, which maintains global matrices with information about pairs of VNET hosts. In certain embodiments, only those pairs whose VNET daemons exchange messages have entries. Through these mechanisms, the Proxy has a view of the physical network interconnecting the machines running VNET daemons and a view of the application topology and traffic load of the VMs.

In certain embodiments, as shown in FIG. 11, the VADAPT component 1130 of Virtuoso 1100, using the VTTIF 1140 and Wren 1180 mechanisms, has a view of the dynamic performance characteristics of the physical network interconnecting the machines running VNET 1150 daemons and a view of the demands that the VMs 1110 place on the network. More specifically, VADAPT 1130 receives a graph representing an application topology of the VMs 1110 and a traffic load matrix among them. VADAPT 1130 also receives matrices representing available bandwidth and latency among the Hosts 1190 running VNET 1150 daemons. VADAPT 1130 uses this information to choose a configuration that maximizes or improves performance of the application 1115 running inside the VMs 1110. A configuration includes a mapping of VMs 1110 to Hosts 1190 running VNET 1150 daemons; a topology of the VNET overlay network, forwarding rules on that topology, and a choice of resource reservations on the network and the hosts, if available.

In certain embodiments, a VM is characterized by one or more parameters, such as memory size, disk space, processing power, available bandwidth, etc. Whether a particular VM may be put on a particular host depends on one or more parameters such as size, amount of memory, etc.

Figure 12:
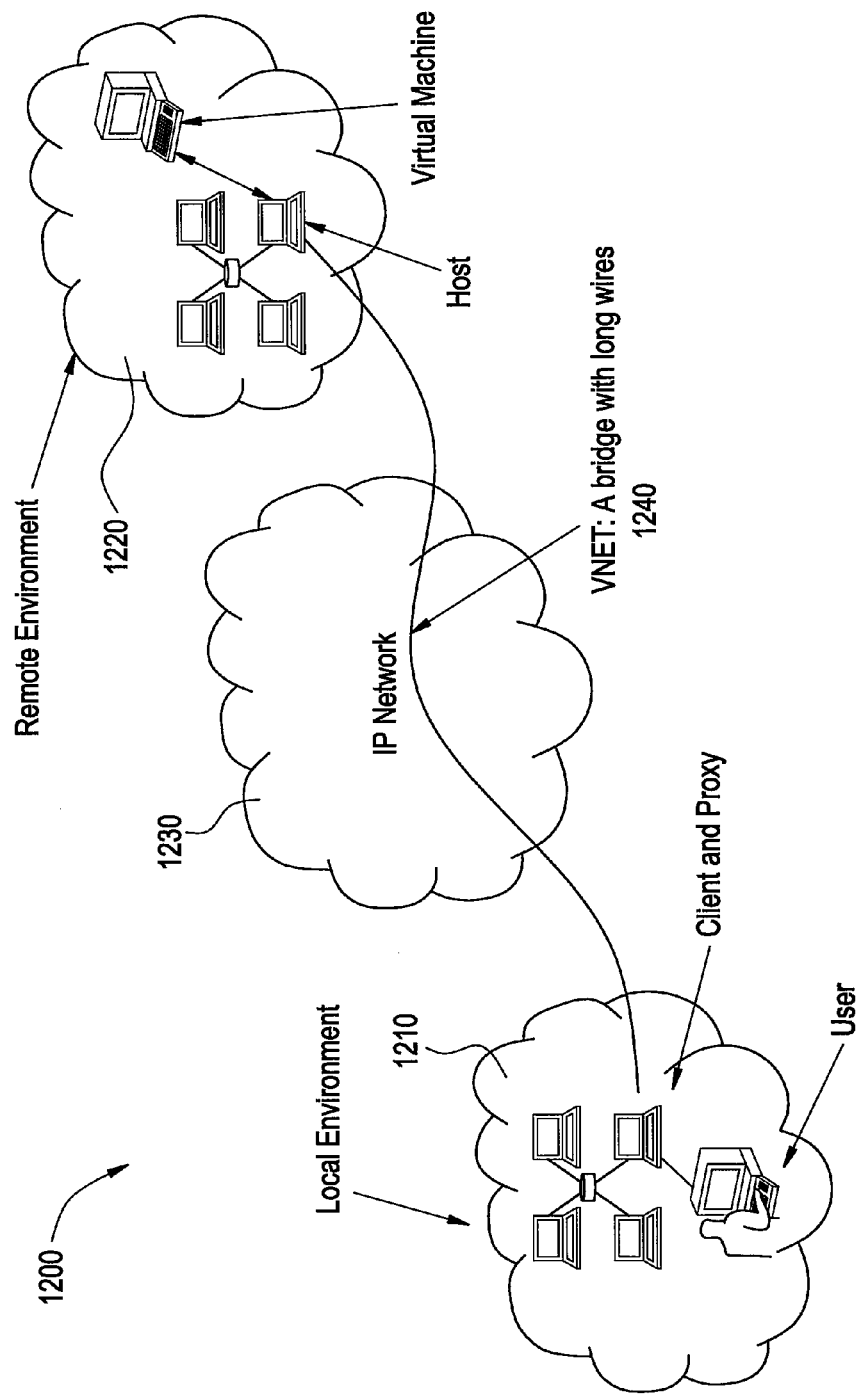
FIG. 12 shows an exemplary distributed computing system in accordance with an embodiment of the present invention.

For example, as shown in FIG. 12, an exemplary distributed computing system 1200 including a local environment 1210 and a remote environment 1220 may communicate and distribute application and other processing via a network 1230. using the system 1200, a user may access a remote environment 1220 via a client and proxy in his or her local environment 1210 and a network connection 1230 to the remote environment 1220. VNET 1240, a virtual network overlay topology, facilitates initiation of one or more virtual machines on one or more hosts in the remote environment 1220. Using obtained inference information regarding the network, adaptations are applied to the network to schedule resources for processing of the user's application via the virtual network without modification of the application or the user's operating system.

In certain embodiments, heuristic solutions may be applied. Additionally, information about the physical network may be incorporated.

In certain embodiments, a VNET topology may be provided based on a directed graph G=(H, E), in which H is the set of all of the Hosts that are running VNET daemons and can host VMs. Each edge e=(i, j)∈E is a prospective link between VNET daemons, and e has a real-valued capacity $c_e$ which is a bandwidth that the edge can carry in that direction. This is the available bandwidth between two Hosts (the ones running daemons i and j) reported by Wren, for example.

A monitoring tool, such as Wren, provides estimates for available bandwidth and latencies over each link in the VNET topology graph, for example. These estimates may be described by a bandwidth capacity function bw:E→R, and a latency function, lat:E→R.

VNET may collect information regarding space capacity (in bytes) and compute capacity made available by each host, described by a host compute capacity function, compute: H→R and a host space capacity function, size:H→R. The set of virtual machines participating in the application is denoted by the set V. The size and compute capacity demands made by every VM can also be estimated and denoted by a VM compute demand function, vm_compute:VM→R and a VM space demand function, vm_size:VM→R, respectively.

A path, p(i, j), between two VNET daemons i, j∈H is defined as an ordered collection of links in E, $\langle(i,v_1), (v_1,v_2), \ldots, (v_n,j)\rangle$, which are the set of VNET links traversed to get from VNET daemon i to j given the current forwarding rules, and topology, $v_1, \ldots v_n \in H$. P is a set of all paths.

V is a set of VMs in the system, while M is a function mapping VMs to daemons. M(k)=1 if VM k∈V is mapped to host l∈H.

An initial mapping of virtual machines to hosts, M, may be a set of 3-tuples, for example, $M_i=(vm_i, h_i, y_i)$, i=1, 2 . . . n, where $vm_i \in V$ is the virtual machine in question, $h_i \in H$ is the host that it is currently mapped onto and $y_i \in \{0,1\}$ specifies whether the current mapping of VM to host can be changed or not. A value of 0 implies that the current mapping can be changed and a value of 1 means that the current mapping should be maintained, for example.

In certain embodiments, bandwidth and compute rate estimates do not implicitly imply reservation, they are random variables that follow a normal distribution with a mean of the estimated value. In certain embodiments, for each edge in E, a function nw_reserve:E→{0, 1} may be defined. If a value associated with the edge is 0 then the link cannot be reserved, and the actual bandwidth has a normal distribution with a mean of bw(E) and a variance $\sigma^2_{bw}(E)$, else the link is reservable and the actual bandwidth is bw(E). Similarly, for each host a function cpu_reserve:H→{0,1} is defined, where a value of 0 means that the compute capacity made available by the host is not reservable and the actual value has a normal distribution with a mean of compute(H) and a variance $\sigma^2_{compute}(H)$.

VTTIF infers the application communication topology in order to generate traffic requirements of an application A, which is a set of 4-tuples, $A_i=(s_i, d_i, b_i, l_i)$, i=1, 2 . . . m, where $s_i$ is the source VM, $d_i$ is the destination VM, $b_i$ is a bandwidth demand between the source destination pair, and $l_i$ is a latency demand between the source destination pair. In certain embodiments, cost of migrating a virtual machine is dependent on a size of the virtual machine, network characteristics between the corresponding hosts and a specific migration scheme used. These estimates may be described by a migration function, migrate:VM×H×H→R$^+$, that provides an estimate in terms of the time to migrate a virtual machine from one host to another. There is more than one way to take into account the cost of migration, one being to keep the costs of migration for each of the VMs below a certain threshold.

In certain embodiments, an adaptation algorithm uses measured and inferred data to drive available adaptation mechanisms in order to improve application throughput. For example, an adaptation algorithm provides (i) a mapping from VMs to hosts, vmap:VM→H, meeting the size and compute capacity demands of the VMs within the host constraints and leveraging CPU reservations where available. Further, the new mapping may reflect mapping constraints provided. The adaptation algorithm may also provide (ii) a routing, R:A→P, where P is the set of all paths in the graph G=(H,E), i.e. for every 4-tuple, $A_i=(s_i, d_i, b_i, l_i)$, allocate a path, $p(vmap(s_i),vmap(d_i))$, over the overlay graph, G, meeting the application demands while satisfying the bandwidth and latency constraints of the network and leveraging network reservations where available.

Once the mappings and paths have been decided, each VNET edge will have a residual capacity, $rc_e$, which is the bandwidth remaining unused on that edge, in that direction $$rc_e = bw_e - \sum_{e \in R(A_i)} b_i.$$

For each mapped path, $R(A_i)$, a bottleneck residual capacity mat be defined as $$brc(R(A_i)) = \min_{e \in R(A_i)} \{rc_e\}$$

and its total latency $$tl\left(R(Ai) = \sum_{e \in R(A_i)} (lat_e)\right).$$

In certain embodiments, residual capacity can be described at two levels, at the level of VNET edges and at the level of paths between communicating VMs. Various objective functions that could be defined may fall into one of two classes, for example: an edge-level or a path-level objective function. An edge-level function may include a composite function, f, that is a function of, g, a function of the migration costs of all the VMs and h, a function of the total latency over all the edges for each routing and k, a function of the residual bottleneck bandwidths over all the edges in the VNET graph. A path-level function may include a composite function, f, that is a function of, g, a function of the migration costs of all the VMs and h, a function of the total latency over all the edges for each routing and k, a function of the residual bottleneck bandwidths over all the paths in the routing.

In certain embodiments, for example, to determine VM connectivity, a set of ordered 3-tuples A=(S, D, C) are provided. Any tuple, $A(s_i, d_i, c_i)$, corresponds to an entry in a traffic load matrix supplied by VTTIF. More specifically, if there are two VMs, k, m∈V, where $M(k)=s_i$ and $M(m)=d_i$, then $c_i$ is a traffic matrix entry for a flow from VM k to VM m.

A configuration CONF=(M,P) includes a VM to VNET daemon mapping function M and a set of paths P among the VNET daemons used for connectivity of the VMs. Topology and forwarding rules for the daemons follow from the set of paths. Each tuple, $A_i$, can be mapped to one of multiple paths, $p(s_i,d_i)$. Once a configuration has been determined, each VNET link e∈E has a real-valued residual capacity $rc_e$ which is a bandwidth remaining unused on that edge.

For each mapped path $p(s_i,d_i)$ a bottleneck bandwidth $b(p(s_i,d_i))$ may be define as $(\min(cr_e))\forall e \in p(s_i,d_i)$.

In certain embodiments, a configuration CONF is attempted which maps every VM in V to a VNET daemon, and every input tuple $A_i$ to a network path $p(s_i,d_i)$ such that the total bottleneck capacity on the VNET graph, $$\sum_{p \in P} b(p(s_i, d_i))$$

(2) is maximized or minimized subject to the constraint that $\forall e \in E: rc_e \geq 0$ (3).

In certain embodiments, maximizing or increasing the residual bottleneck capacity leaves room for the application to increase performance within the current configuration. Conversely, minimizing or reducing the residual bottleneck capacity increases room for other applications to enter the system. This problem is NP-complete by reduction from the edge disjoint path problem, for example.

In certain embodiments, a greedy heuristic solution may be applied with two sequential steps: (1) find a mapping from VMs to Hosts, and (2) determine paths for each pair of communicating VMs. In certain embodiments, all mapping are determined in a single pass. In certain embodiments, mappings are determined using multiple passes (e.g., two passes) over the input data.

In certain embodiments, a mapping algorithm may be applied, followed by a routing algorithm, thus first determined VM to host mappings and then computing routing between VMs. Alternatively, mapping and routing may be interleaved wherein a mapping is determined for a pair of communicating VMs following by identification of a path for the two VMs over the network.

In certain embodiments, VADAPT uses a greedy heuristic algorithm to map virtual machines onto physical hosts. Input to the algorithm includes application communication behavior as captured by VTTIF and available bandwidth between each pair of VNET daemons (e.g., as reported by Wren or other monitoring tool) expressed as adjacency lists.

Using a greedy heuristic algorithm, VADAPT generates a new VM adjacency list which represents the traffic intensity between VNET daemons that is implied by the VTTIF list and the current mapping of VMs to hosts. VADAPT orders the VM adjacency list by decreasing traffic intensity. VADAPT extracts an ordered list of VMs from the above with a breadth first approach, eliminating duplicates. For each pair of VNET daemons, the maximum bottleneck bandwidth (the widest path) is found using an adapted Dijkstra's algorithm, for example. VADAPT orders the VNET daemon adjacency list by decreasing bottleneck bandwidth. VADAPT extracts an ordered list of VNET daemons from the above with a breadth first approach, eliminating duplicates. VMs are mapped to VNET daemons in order using the ordered list of VMs and VNET daemons obtained above. Differences between the current mapping and the new mapping are computed and migration instructions are issued to achieve the new mapping.

Once the VM to Host mapping has been determined, VADAPT uses a greedy heuristic algorithm to determine a path for each pair of communicating VMs. The VNET links and forwarding rules derive from the paths. As above, VADAPT uses VTTIF and Wren outputs, expressed as adjacency lists, as inputs. VADAPT orders the set A of VM to VM communication demands in descending order of communication intensity (e.g., a VTTIF traffic matrix entry). Each 3-tuple in the ordered set A is considered, making a greedy mapping of the 3-tuple onto a path. The mapping is on the current residual capacity graph G and uses an adapted version of Dijkstra's algorithm, for example. In certain embodiments, no backtracking is done at this stage.

Certain embodiments use a modified version of Dijkstra's algorithm to select a path for each 3-tuple that has the maximum bottleneck bandwidth. This is the "select widest" approach. Dijkstra's algorithm solves a single-source shortest paths problem on a weighted, directed graph G=(H,E). A modified Dijkstra's algorithm solves the single-source widest paths problem on a weighted directed graph G=(H,E) with a weight function c:E→R, which is the available bandwidth.

A set U of vertices is maintained whose final widest-path weights from source u have already been determined. That is, for all vertices v∈U, b[v]=γ(u,v), where γ(u,v) is a widest path value from source u to vertex v. The algorithm repeatedly selects the vertex w∈H−U with the largest widest-path estimate, inserts w into U and relaxes edges leaving w. A priority queue Q is maintained that contains all the vertices in H−U, keyed by their b values. This implementation assumes that graph G is represented by adjacency lists. Widest path estimates and predecessors are initialized to zero or nil. A modified process of relaxing an edge (w,v) includes testing whether the bottleneck bandwidth decreases for a path from source u to vertex v by going through w. If it does, then b[v] and π[v] are updated.

Simulated annealing (SA) is a probabilistic evolutionary method that may be used to solve global optimization problems, especially if a good heuristic is not known. SA's ability to locate a good, although perhaps non-optimal, solution for a given objective function in the face of a large search space may be used for mapping in certain embodiments, for example. Since the physical layer and VNET layer graphs in certain embodiments are fully connected, there are many possible forwarding paths and mappings. Additionally, as SA incrementally improves its solution with time, there is some solution available at all times.

A basic SA approach is to start with some initial solution to the problem computed using some simple heuristic such as the adapted Dijkstra based heuristic described above. SA iterations then attempt to find better solutions by perturbing the current solution and evaluating its quality using a cost function, for example. At any iteration, the system state is the set of prospective solutions. Random perturbations of the SA algorithm allow exploration of a diverse range of the search space, including points that may appear sub-optimal or even worse then previous options but may lead to better solutions later. A probability of choosing options that are worse than those in a present iteration is reduced as the iterations proceed, focusing increasingly on finding better solutions close to those in the current iteration.

A role of the perturbation function (PF) is to find neighbors of the current state that are then chosen according to a probability function P(dE,T) of the energy difference dE=E(s')−E(s) between the two states, and of a global time-varying parameter T (the temperature). A probability function such as $e^{dE/T}$ may be used if dE is negative, for example, and may be set to 1 otherwise. As iterations proceed, T may be decreased, which reduces a probability of jumping into states that are worse than the current state.

Given a configuration CONF=(M,P), where P is a set of forwarding paths p(i, j), and each p(i, j) is a sequence of $k_{i,j}$ vertices $v_i$, $v_2$, ..., $v_j$, the perturbation function selects a neighbor N(CONF) of the current configuration with the following probabilities for each p(i, j)∈P. With a probability of ⅓, the PF adds a random vertex $v_r$ into the path sequence where $v_r$∈V and ∉p(i, j). Note that a set V includes potential physical nodes which are running VNET and hence are capable of routing VNET traffic. This step attempts to modify each path by randomly adding a potential overlay node in the existing forwarding path. With a probability of ⅓, PF deletes a random vertex $v_r$ from the path sequence where $v_r$∈p(i, j). With a probability of ⅓, PF swaps two nodes $v_r$ and $v_y$ where x≠y and $v_x$, $v_y$∈p(i, j).

In certain embodiments, only current forwarding paths may be perturbed. Alternatively and/or in addition, mappings of VMs to different VNET hosts may be perturbed (e.g., with a lower probability to reduce effects on forwarding paths).

In certain embodiments, a cost evaluation function CEF computes a cost of a configuration C using Equation 2. After a neighbor N(C) is found using the perturbation function, a cost difference CEF(N(C))−CEF(C) is computed. This energy difference is used to compute a future path in the simulated annealing approach using a probability $e^{(CEF(N(c))-CEF(c))/t}$ if the difference is negative, or otherwise set to 1, for example. As iterations proceed and temperature decreases, the SA algorithm converges to the best state it encounters in its search space.

Figure 13:
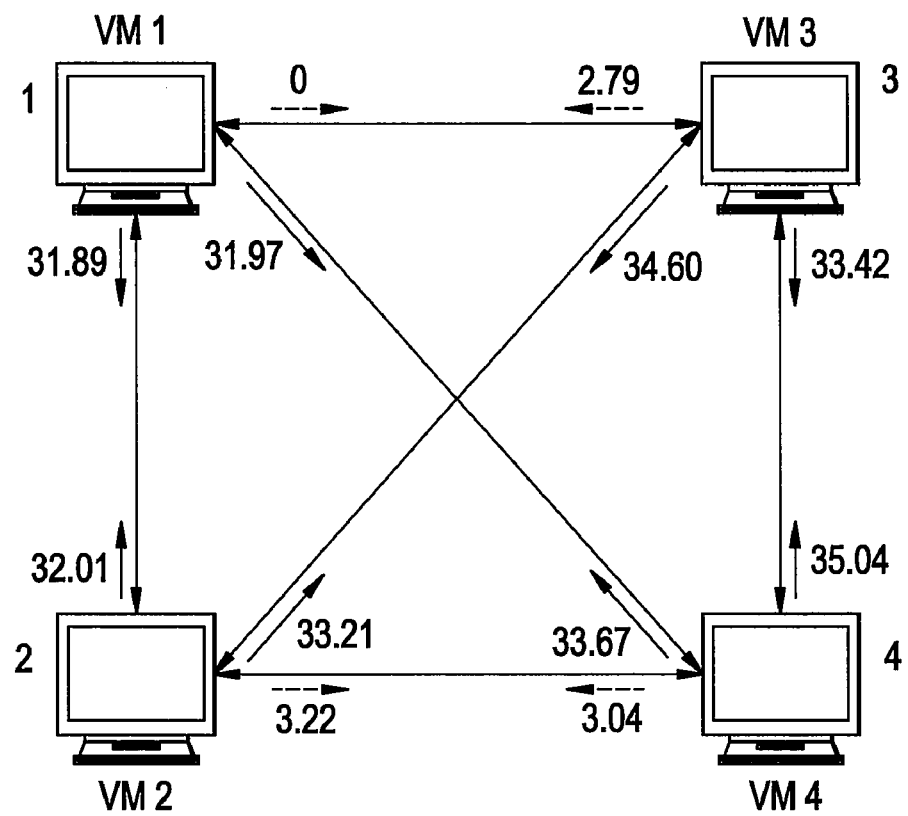
FIG. 13 shows an example of an application topology inferred by VTTIF for a 4 VM NAS multigrid benchmark according to an embodiment of the present invention.

FIG. 13 shows an example of an application topology inferred by VTTIF for a 4 VM NAS multigrid benchmark. The thickness of the arrows are directly proportional to the bandwidth demand in that direction. Numbers shown indicate Mb/second.

Figure 14:
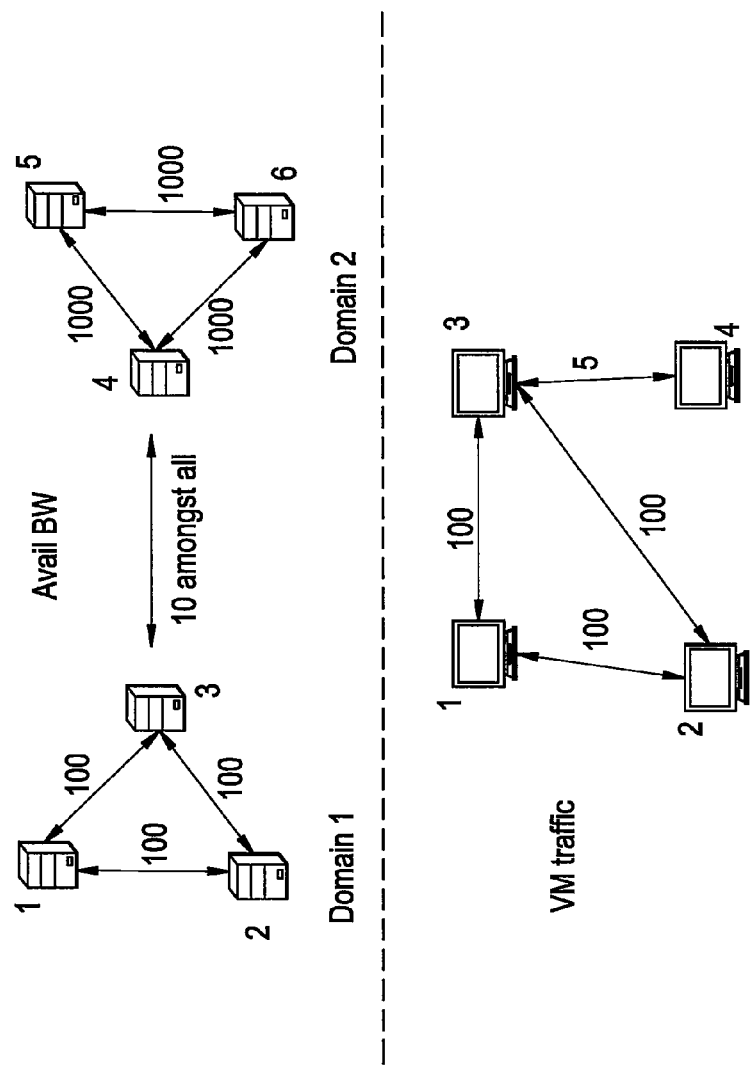
FIG. 14 illustrates an example of a host to VM mapping problem solveable in accordance with an embodiment of the present invention.

FIG. 14 illustrates an example of a host to VM mapping problem solveable according to an embodiment of the present invention. The VNET node topology shown in FIG. 14 includes two clusters of three machines each. The domain 1 cluster has 100 Mbps links interconnecting the machines, while domain 2 cluster has 1000 Mbps links. The available bandwidth on the link connecting the two domains is 10 Mbps. This scenario is similar to a setup including two tightly coupled clusters connected to each other via a wide area network (WAN). The lower part of the figure shows a corresponding VM configuration. VMs 1, 2 and 3 communicate with a much higher bandwidth as compared to VM 4. An optimal solution for this would be to place VMs 1, 2 and 3 on the three VNET nodes in domain 2 and place VM 4 on a VNET node in domain 1. A mapping using greedy heuristics may include, for example, VM1 to machine 5, VM2 to machine 4, VM3 to machine 6, and VM4 to 1. A mapping using simulated annealing may include VMI to machine 4, VM2 to machine 5, VM3 to machine 6, and VM4 to machine 1.

Thus, the Virtuoso and Wren systems may be integrated to provide a virtual execution environment that simplifies application portability while providing application and resource measurements for transparent optimization of application performance. Extensions may be added to the Wren passive monitoring system to support online available bandwidth measurement and exportation of the measurement results via a SOAP interface, for example. This system produces available bandwidth observations while monitoring bursty VNET traffic, for example. VADAPT, the adaptation component of Virtuoso, uses this information provided by Wren along with application characteristics provided by VITIF to dynamically configure the application, maximizing its performance given constraints. In solving this NP-hard adaptation problem, a variety of solutions, such as greedy heuristics and/or simulated annealing, may be used. In an embodiment, a greedy heuristic may be used as a starting point for simulated annealing, for example.

User Driven Scheduling

In certain embodiments, a user may manipulate his or her VM's schedule using input, such as a joystick. In certain embodiments, an on-screen display illustrates a current schedule's cost and indicates when the user's desired schedule is impossible due to the schedules of other VMs and/or resource constraints, for example. While the example provided herein relates to use of a VM as a replacement desktop, user input for scheduling may be used in a variety applications as discussed herein, including parallel application in a virtualized computing environment. Additional information regarding certain embodiments of user-driven scheduling in conjunction with the virtual network system may be found in B. Lin, and P. Dinda, Putting the User in Direct Control of CPU Scheduling, Technical Report, NWU-EECS-06-07, Department of Electrical Engineering and Computer Science, Northwestern University, July, 2006, which is herein incorporated by reference in its entirety.

Service-oriented systems often schedule resources such as a CPU so that relevant service-level agreements (SLAs) are honored. Increasingly, service-oriented computing is targeting end-users by providing services that are more and more akin to those available on typical interactive desktop computers. In certain embodiments, a combination of resource scheduling techniques that expose direct control inputs, a cost model, and appropriate user interface(s) may be used to provide direct user input into a scheduling process. For example, virtual machines may be scheduled to support interactive desktop users on a CPU of a provider machine.

In certain embodiments, a user of a VM can continuously adjust its schedule using an interface akin to a two-dimensional throttle or joystick, for example, up to the resource limits and constraints of other VMs. In certain embodiments, as the user adjusts his or her VM schedule, an on-screen display shows a cost of the current schedule.

In certain embodiments, using a scheduling client, such as a VSched client, a user can connect to a VSched server and request that a process be executed according to a period and slice, for example. A monitor keeps track of pids used by the VMs. In response to a request to execute a process, the VSched server determines whether the request is feasible. If so, the server adds the process to the array and informs the scheduling core. When the scheduling core receives scheduling requests from the server module, the core interrupts a current task and makes a scheduling decision based on a new task set, for example.

A graphical user interface allows a user to set an appropriate (period, slice) constraint for a VM while viewing a cost of the current schedule. Several possible interfaces may be used to allow the user to directly manipulate (period, slice) for a VM. For example, an on-screen interface with sliders, a centering joystick, a centering joystick with force feedback, a non-centering joystick, a precision non-centering joystick, a trackball, a throttle controller, a knob controller, etc. may be used. As an example, using a non-centering joystick, horizontal and vertical deflection of the control stalk are mapped into increasing period (e.g., left to right) and increasing slice/period utilization (e.g., bottom to top). Positions of the joystick correspond to valid schedules.

A cost of a schedule may be reflected, for example, as follows:

$$\text{cost} = 100 \times \left( \frac{\text{slice}}{\text{period}} + \beta \times \frac{\text{overhead}}{\text{slice}} \right)$$

(4), wherein overhead is a time to execute the scheduling core once. In certain embodiments, as slice declines, more time is spent in scheduling and in the kernel on behalf of a process, for example.

FIG. 15 illustrates a flow diagram for a method 1500 for performance improvement in a virtual network according to an embodiment of the present invention. First, at step 1510, a traffic load and application topology of virtual machines is measured on a network. For example, as described above, VTTIF may monitor application traffic to produce a view of the application's network demands.

At step 1520, performance of an underlying physical network is monitored using the application's traffic as measurement traffic. For example, as described above, components of an adaptive virtualized computing environment may monitor the underlying network and its topology. An application's traffic may serve as measurement traffic, and tools, such as Wren, can probe and characterize the network based on the traffic data.

At step 1530, the application is automatically adapted to the network. For example, VNET may adapt the application to the network according to VM traffic load and application topology based on the monitored underlying network and topology. Algorithms may be provided for choosing an assignment of virtual machines to physical hosts, an overlay topology among the virtual machines and hosts, and forwarding rules on the overlay topology related to application throughput, such as by the VADAPT component described above.

At step 1540, network and processing resources are reserved. For example, VNET may adapt the network to an application by taking advantage of resource reservation mechanisms, such as VRESERVE and VSched described above. These services can be done on behalf of existing, unmodified applications and operating systems running on the virtual machines.

One or more of the steps of the method 1500 may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

Several embodiments are described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any machine-readable media for accomplishing its operations. As noted above, the embodiments of the present invention may be implemented using an existing computer processor, or by a special purpose computer processor incorporated for this or another purpose or by a hardwired system.

As noted above, certain embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Certain embodiments of the invention are described in the general context of method steps which may be implemented in one embodiment by a program product including machine-executable instructions, such as program code, for example in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Certain embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

Those skilled in the art will appreciate that the embodiments disclosed herein may be applied to the formation of any virtual machine computing system. Certain features of the embodiments of the claimed subject matter have been illustrated as described herein; however, many modifications, substitutions, changes and equivalents will now occur to those skilled in the art. Additionally, while several functional blocks and relations between them have been described in detail, it is contemplated by those of skill in the art that several of the operations may be performed without the use of the others, or additional functions or relationships between functions may be established and still be in accordance with the claimed subject matter. It is, therefore, to be understood that the appended claims are intended to cover all such modifications and changes as fall within the true spirit of the embodiments of the claimed subject matter.

The invention claimed is:

1. A method for automatic interference and adaptation of a virtualized computer environment, said method comprising:
    measuring application traffic on a virtual network to infer network demands for an application;
    monitoring performance of an underlying physical network associated with the virtual network using application traffic;
    automatically adapting the application to the virtual network based on the measured application traffic, the monitored network performance, and one or more adaptation control algorithms, and
    automatically changing virtual network topology and virtual machine mappings to improve application performance, wherein the virtual network topology is changed and a first virtual machine that is mapped solely to a first VNET daemon of a first host in a first local area network is instead mapped solely to a second VNET daemon of a second host in a second local area network as a result of a greedy heuristic algorithm.

2. The method of claim 1, further comprising automatically reserving network and virtual machine processing resources for the application.

3. The method of claim 2, further comprising accepting user input regarding reservation and scheduling of resources.

4. The method of claim 1, wherein said one or more adaptation control algorithms choose an assignment of virtual machines to physical hosts, an overlay topology among the virtual machines and hosts, and forwarding rules on the overlay topology relating to application throughput.

5. The method of claim 1, wherein said network comprises an optical network having light paths for transmission of data, said method further comprising adapting light path resources for the application.

6. The method of claim 1, wherein VNET traffic can be tunneled over a secure shell (SSH) connection if the SSH connection is made to a host.

7. The method of claim 1, further comprising calculating an upper bound on a time to configure the virtual network or to change a topology of the virtual network; and determining sampling and smoothing intervals based on the calculated upper bound.

8. The method of claim 1, further comprising calculating an upper bound on a time to change a topology of the virtual network, wherein the topology of the virtual network is provided based on a topology graph.

9. One or more computer memories having one or more sets of instructions for execution on one or more computing devices, said one or more sets of instructions comprising:
virtual topology and traffic inference framework instructions adapted to monitor traffic for an application on a virtual network to produce a view of network demands for the application;
monitoring instructions adapted to monitor performance of an underlying physical network associated with the virtual network using traffic for the application;
adaptation instructions adapted to automatically adapt the application to the virtual network based on the measured application traffic, the monitored network performance, and one or more adaptation control algorithms; and
reservation and scheduling instructions adapted to automatically reserve network and virtual machine processing resources for the application, wherein the reservation and scheduling instructions are adapted to automatically change virtual network topology and virtual machine mappings to improve application performance, wherein a first virtual machine that is mapped solely to a first VNET daemon in a first local area network is instead mapped solely to a second VNET daemon in a second local area network based on application communication behavior expressed as a virtual machine adjacency list that serves as an input to the reservation and scheduling instructions, wherein the reservation and scheduling instructions use an earliest-deadline-first algorithm schedulability test for admission control and use the earliest-deadline-first scheduling to meet deadlines.

10. The one or more sets of instructions of claim 9, wherein the virtual topology and traffic inference framework instructions form a traffic matrix representing network resource demands for the application.

11. The one or more sets of instructions of claim 10, wherein the virtual topology and traffic inference framework instructions include a smoothing window within which application traffic data is aggregated.

12. The one or more sets of instructions of claim 9, wherein the virtual topology and traffic inference framework instructions use inter-virtual machine traffic on the virtual network to infer at least one of network demands and underlying network performance characteristics.

13. The one or more sets of instructions of claim 9, wherein said reservation and scheduling instructions comprise a reservation component adapted to analyze one or more overlay links in a network topology and automatically reserve a path for each overlay link.

14. The one or more sets of instructions of claim 9, wherein said reservation and scheduling instructions comprise a virtual scheduler adapted to schedule a collection of virtual machines in a host according to a model of independent, periodic, real-time tasks using (period, slice) constraints.

15. The one or more sets of instructions of claim 14, wherein the virtual scheduler accepts user feedback regarding a virtual machine schedule.

16. The one or more sets of instructions of claim 9, wherein said reservation and scheduling instructions provide scheduling of virtual machines to a mix of batch and interactive workloads on a host.

17. The one or more sets of instructions of claim 9, wherein said system adapts said virtual network and virtual machines on the network to the application without modification of the application or machine operating system.

18. The one or more sets of instructions of claim 9, wherein said adaptation instructions accept user input to affect adaptation and scheduling of network resources.

19. The one or more sets of instructions of claim 9, wherein said adaptation instructions automatically determine at least one of circuit switching, packet switching, and lightpath switching in the network based on a path throughput and latency in the network and automatically reserve network resources for the application.

20. The one or more sets of instructions of claim 9, wherein said one or more adaptation control algorithms comprise at least one of a greedy heuristic and simulated annealing.

21. The one or more sets of instructions of claim 9, wherein said one or more adaptation control algorithms choose an assignment of virtual machines to physical hosts, an overlay topology among the virtual machines and hosts, and forwarding rules on the overlay topology relating to application throughput.

22. The one or more sets of instructions of claim 9, wherein said network comprises an optical network having light paths for transmission of data, and wherein said one or more sets of instructions adapt light path resources for the application.

23. The method of claim 9, wherein said one or more adaptation control algorithms comprise at least one of a greedy heuristic and simulated annealing wherein the reservation and scheduling instructions are used to enforce compute rate and interactivity commitments made to a particular virtual machine.

24. The one or more sets of instructions of claim 9, wherein the reservation and scheduling instructions creates a dedicated light path in a circuit switched, optical light path network.

25. The one or more sets of instructions of claim 9, wherein the greedy heuristic algorithm determines mappings from virtual machines to respective hosts and determines paths for each pair of communicating virtual machines.

26. The one or more sets of instructions of claim 9, wherein the reservation and scheduling instructions schedule a particular collection of virtual machines on a particular host.

27. The one or more sets of instructions of claim 9, wherein, after a decision is made as to which overlay links to create, but before the overlay links are created, the reservation and scheduling instructions analyze each overlay link to determine whether any of the overlay links is better served using a reservation.

* * * * *